United States Patent
Lutnick et al.

(10) Patent No.: US 10,896,463 B2
(45) Date of Patent: Jan. 19, 2021

(54) TRADING SYSTEM WITH PRICE IMPROVEMENT

(75) Inventors: Howard W Lutnick, New York, NY (US); Michael Sweeting, London (GB)

(73) Assignee: BGC PARTNERS, INC., New York, NY (US)

( * ) Notice: Subject to any disclaimer, the term of this patent is extended or adjusted under 35 U.S.C. 154(b) by 1088 days.

(21) Appl. No.: 13/366,956

(22) Filed: Feb. 6, 2012

(65) Prior Publication Data

US 2013/0204759 A1    Aug. 8, 2013
US 2016/0012529 A9    Jan. 14, 2016

Related U.S. Application Data

(63) Continuation of application No. 12/412,119, filed on Mar. 26, 2009, now Pat. No. 8,112,348, which is a continuation-in-part of application No. 11/238,422, filed on Sep. 28, 2005, now Pat. No. 8,301,540, and a continuation-in-part of application No. 10/171,009, filed on Jun. 11, 2002, now Pat. No. 7,574,395, said application No. 12/412,119 is a continuation-in-part of application No. 10/826,779, filed on Apr. 16, 2004, now Pat. No. 8,019,672.

(60) Provisional application No. 60/613,830, filed on Sep. 28, 2004, provisional application No. 60/463,835, filed on Apr. 16, 2003.

(51) Int. Cl.
*G06Q 40/00*      (2012.01)
*G06Q 40/04*      (2012.01)

(52) U.S. Cl.
CPC .................... *G06Q 40/04* (2013.01)

(58) Field of Classification Search
CPC ........ G06Q 40/00; G06Q 30/00; G06Q 40/04; G06Q 40/06; G06Q 30/06
USPC .............................................. 705/35, 36 R, 37
See application file for complete search history.

(56) References Cited

U.S. PATENT DOCUMENTS

| | | | |
|---|---|---|---|
| 5,136,501 A | 8/1992 | Silverman et al. | |
| 5,845,266 A | 12/1998 | Lupien et al. | |
| 5,878,416 A | 3/1999 | Harris et al. | |
| 5,905,974 A | 5/1999 | Fraser et al. | |
| 6,021,397 A | 2/2000 | Jones et al. | |
| 6,098,051 A | 8/2000 | Lupien et al. | |
| 60,463,835 | 4/2003 | Sweeting et al. | |
| 6,618,707 B1* | 9/2003 | Gary | G06Q 40/00 705/36 R |
| 6,850,907 B2 | 2/2005 | Lutnick et al. | |
| 7,155,410 B1* | 12/2006 | Woodmansey | G06Q 40/04 705/37 |
| 7,162,448 B2 | 1/2007 | Madoff et al. | |
| 7,209,896 B1 | 4/2007 | Serkin et al. | |

(Continued)

FOREIGN PATENT DOCUMENTS

GB    2389687    12/2003
WO    WO 97/08640    3/1997

(Continued)

OTHER PUBLICATIONS

Battalio et al., "Does the Limit Order Routing Decision Matter?", 2002, Oxford University Press. vol. 15, No. 1, pp. 159-194.*

(Continued)

*Primary Examiner* — Hani M Kazimi

(57) ABSTRACT

A computer trading system has price improvement features.

18 Claims, 27 Drawing Sheets

(56) References Cited

U.S. PATENT DOCUMENTS

| | | | |
|---|---|---|---|
| 7,212,999 B2 | 5/2007 | Friesen et al. | |
| 7,225,151 B1 | 5/2007 | Konia | |
| 7,246,093 B1* | 7/2007 | Katz | G06Q 40/00 705/37 |
| 7,343,341 B2* | 3/2008 | Sandor | G06Q 30/08 705/37 |
| 7,383,220 B1 | 6/2008 | Keith | |
| 7,392,214 B1 | 6/2008 | Fraser et al. | |
| 7,533,052 B2 | 5/2009 | Tilfors et al. | |
| 7,558,753 B2 | 7/2009 | Neubert et al. | |
| 7,574,395 B2* | 8/2009 | Sweeting | G06Q 40/00 705/35 |
| 7,660,761 B2 | 2/2010 | Zhou et al. | |
| 7,668,767 B1 | 2/2010 | Borsand | |
| 7,747,493 B1 | 6/2010 | Monroe | |
| 8,019,672 B2 | 9/2011 | Sweeting et al. | |
| 8,112,348 B2 | 2/2012 | Sweeting | |
| 8,380,614 B1 | 2/2013 | Sweeting et al. | |
| RE47,060 E | 9/2018 | Sweeting | |
| 2001/0042785 A1 | 11/2001 | Walker et al. | |
| 2001/0044767 A1 | 11/2001 | Madoff et al. | |
| 2001/0044770 A1 | 11/2001 | Keith | |
| 2002/0095369 A1* | 7/2002 | Kaplan | G06Q 30/08 705/37 |
| 2002/0116314 A1* | 8/2002 | Spencer | G06Q 40/04 705/37 |
| 2002/0169703 A1 | 11/2002 | Lutnick et al. | |
| 2002/0198816 A1* | 12/2002 | Gilbert | G06Q 40/00 705/37 |
| 2003/0009412 A1* | 1/2003 | Furbush et al. | 705/37 |
| 2003/0033212 A1 | 2/2003 | Sandhu et al. | |
| 2003/0046218 A1 | 3/2003 | Albanese et al. | |
| 2003/0055775 A1 | 3/2003 | McQuain | |
| 2003/0115128 A1 | 6/2003 | Lange et al. | |
| 2003/0229569 A1* | 12/2003 | Nalbandian | G06Q 40/00 705/37 |
| 2003/0233306 A1 | 12/2003 | Madhavan et al. | |
| 2004/0034591 A1* | 2/2004 | Waelbroeck | G06Q 30/0251 705/37 |
| 2004/0059666 A1 | 3/2004 | Waelbroeck et al. | |
| 2004/0117302 A1 | 6/2004 | Weichert et al. | |
| 2004/0210511 A1 | 10/2004 | Waelbroeck et al. | |
| 2004/0243505 A1* | 12/2004 | Sweeting | G06Q 40/00 705/37 |
| 2004/0254804 A1 | 12/2004 | Peterffy et al. | |
| 2005/0038732 A1* | 2/2005 | Sweeting | G06Q 40/04 705/37 |
| 2005/0055304 A1* | 3/2005 | Lutnick | G06Q 40/04 705/37 |
| 2005/0075963 A1* | 4/2005 | Balabon | G06Q 40/00 705/36 R |
| 2005/0102215 A1 | 5/2005 | Ausubel et al. | |
| 2005/0125327 A1* | 6/2005 | Fishbain | G06Q 40/00 705/37 |
| 2006/0015441 A1* | 1/2006 | Burkhardt | G06Q 30/08 705/37 |
| 2006/0069637 A1* | 3/2006 | Lutnick | G06Q 40/04 705/37 |
| 2006/0206412 A1 | 9/2006 | Van Luchene et al. | |
| 2006/0229967 A1 | 10/2006 | Sweeting | |
| 2007/0078753 A1* | 4/2007 | Cormack | G06Q 30/08 705/37 |
| 2010/0250425 A1* | 9/2010 | Sweeting | G06Q 40/04 705/37 |
| 2013/0204759 A1* | 8/2013 | Lutnick | G06Q 40/04 705/37 |
| 2015/0127520 A1* | 5/2015 | Farnstrom | G06Q 40/04 705/37 |

FOREIGN PATENT DOCUMENTS

| | | |
|---|---|---|
| WO | WO 00/38093 | 6/2000 |
| WO | WO 00/57307 | 9/2000 |
| WO | WO 00/67172 | 11/2000 |

OTHER PUBLICATIONS

Paul Laird, "MarkAir Comes of Age," Alaska Business Monthly, Anchorage, Oct. 1986, vol. 2, Iss. 10, Sec. 1, p. 28.*

Phillip H. Wiggins, Dow Jumps 25.83 Points to 2,519.77, N.Y. Times, Jul. 29, 1987 at D1.

Steve Watkins, Is the Specialist System Doomed? With Dick Grasso Gone, More Trouble is Brewing for NYSE Specialists, Traders Magazine, Nov. 1, 2003, at 1.

John A. Byrne, Price Improvement Belongs to Dealers, Professor Says, Traders Magazine, Jan. 1, 2003, at 38.

Ananth Madhavan, Market Microstructure: a Practitioner's Guide, 58 Financial Analysts Journal 5, Sep.-Oct. 2002, at 28-42, 4, 6.

Allen Ferrell, Much Ado About Order Flow; 25 Regulation 1, Spring 2002, at 58.

UK Patent Office Communication and Examination Report for Application No. GB 0408554.4, dated Jul. 31, 2006 (3 pages).

USPTO Office Action for Application No. U.S. Appl. No. 10/171,009, dated Sep. 20, 2007 (13 pages).

USPTO Examiner Interview Summary Record and Notice of Allowance and Fees Due for U.S. Appl. No. 10/171,009, dated Oct. 14, 2008 (10 pages).

USPTO Office Action for U.S. Appl. No. 10/826,779, dated Mar. 4, 2008 (13 pages).

USPTO Office Action for U.S. Appl. No. 10/826,779, dated Dec. 9, 2008 (17 pages).

USPTO Office Action for U.S. Appl. No. 10/826,779, dated Mar. 24, 2009 (3 pages).

USPTO Office Action for U.S. Appl. No. 10/826,779, dated Sep. 1, 2009 (21 pages).

USPTO Office Action for U.S. Appl. No. 10/826,779, dated May 25, 2010 (25 pages).

USPTO Pre-Brief Appeal Conference Decision for U.S. Appl. No. 10/826,779, dated Dec. 16, 2010 (2 pages).

USPTO Notice of Allowance and Fees Due for Application No. 10/826,779, dated Jan. 21, 2011 (17 pages).

Schwartz et al.: A subpenny saved, Aug. 2001, Wallstreetlawyer. com, pp. 1-8.

Bacidore et al.: Changes in order characteristics, displayed liquidity, and execution quality on New York Stock Exchange around the switch to decimal pricing, Nov. 2001, New York Stock Exchange Working Paper, pp. 1-61.

* cited by examiner

FIGURE 2B

| ITEM | | | | |
|---|---|---|---|---|
| 100.06 | HIT 10 | 0 X 90 | | ◇ |
| 100.050 - | 100.06 + | 22 X 20 | 0 | 20 |
| 100.05 + - | 100.66 | 22 X 25 | 0 | 30 |
| 100.052 | | | | 40 |

FIGURE 12

| ORDER | TYPE | SIZE | PRICE IMPROVEMENT LEVEL (if applicable) |
|---|---|---|---|
| A | Traditional | 5M | |
| B | Neutral | 4M | |
| C | Dynamic | 3M | |
| SORT | | | |
| C | Dynamic | 3M | |
| A | Traditional | 2M | (PI 1) |
| B | Neutral | 4M | |
| A | Traditional | 3M | |

FIG.14

| ORDER | TYPE | SIZE | PRICE IMPROVEMENT LEVEL (if applicable) |
|-------|------|------|------------------------------------------|
| A | Traditional | 5M | |
| B | Neutral | 4M | |
| C | Dynamic | 40M | |
| SORT | | | |
| C | Dynamic | 5M | (PI 1) |
| B | Neutral | 4M | |
| C | Dynamic | 35M | |
| A | Traditional | 5M | (PI 1) |

FIG. 15

| ORDER | TYPE | SIZE | PRICE IMPROVEMENT LEVEL (if applicable) |
|-------|---------|------|------------------------------------------|
| A | Dynamic | 5M | |
| B | Neutral | 4M | |
| C | Dynamic | 40M | |
| SORT | | | |
| A | Dynamic | 5M | (PI 1) |
| B | Neutral | 4M | |
| A | Dynamic | 40M | (PI 0) |

FIG. 16

| ORDER | TYPE | SIZE | PRICE IMPROVEMENT LEVEL (if applicable) |
|-------|---------|------|------------------------------------------|
| B | Neutral | 4M | |
| C | Dynamic | 3M | |
| SORT | | | |
| B | Neutral | 4M | |
| C | Dynamic | 3M | (PI 0) |

FIG. 17

| ORDER | TYPE | SIZE | PRICE IMPROVEMENT LEVEL (if applicable) |
|---|---|---|---|
| A | Level One | 5M | (PI 1) |
| B | Neutral | 4M | |
| C | Dynamic | 40M | |
| SORT | | | |
| C | Dynamic | 5M | (PI 2) |
| B | Neutral | 4M | |
| C | Dynamic | 35M | (PI 2) |
| A | Level One | 5M | (PI 1) |
| ORDER A CANCELLED | | | |
| SORT | | | |
| C | Dynamic | 5M | (PI 1) |
| B | Neutral | 4M | |
| C | Dynamic | 35M | (PI 1) |

FIG. 18

| ORDER | TYPE | SIZE | PRICE IMPROVEMENT LEVEL (if applicable) |
|---|---|---|---|
| A | Level One | 5M | (PI 1) |
| B | Neutral | 4M | |
| C | Dynamic | 40M | |
| SORT | | | |
| C | Dynamic | 5M | (PI 2) |
| B | Neutral | 4M | |
| C | Dynamic | 35M | (PI 2) |
| A | Level One | 5M | (PI 1) |
| ORDER C IS CANCELLED | | | |
| A | Level One | 5M | (PI 1) |
| B | Neutral | 4M | |

FIG. 19

TRADING SYSTEM WITH PRICE IMPROVEMENT

This application is a continuation of U.S. application Ser. No. 12/412,119, filed Mar. 26, 2009, issued Feb. 7, 2012 as U.S. Pat. No. 8,112,348. The '119 application is a continuation-in-part of U.S. application Ser. No. 11/238,422, filed Sep. 28, 2005, issued Oct. 30, 2012 as U.S. pat. No. 8,301,540, which is a non-provisional of U.S. Provisional App. Ser. No. 60/613,830, filed Sep. 28, 2004. The '119 application is a continuation-in-part of U.S. application Ser. No. 10/171,009, filed Jun. 11, 2002, issued Aug. 11, 2009 at U.S. Pat. No. 7,574,395. The '119 application is a continuation-in-part of U.S. application Ser. No. 10/826,779, filed Apr. 16, 2004, issued Sep. 13, 2011 as U.S. Pat. No. 8,019,672, which is a non-provisional of U.S. Provisional App. Ser. No. 60/463,835, filed Apr. 16, 2003. All of the above applications are incorporated by reference.

BACKGROUND

This application relates to electronic trading systems.

Electronically based trading systems have gained widespread popularity over the years. Such trading systems are frequently used for trading items ranging from financial instruments (such as stocks, bonds, currency, futures, contracts, etc.) to used household goods (such as old records, antiques, etc.). In many of these trading systems, bid/offer-hit/lift processes are used to negotiate a sale of a given item. In such processes, bids and/or offers for items are entered into a trading system and a hit or take is submitted in response to a bid or offer, respectively, to agree to a sale, or a purchase.

A typical exchange that uses bid/offer-hit/lift process is the NASDAQ Stock Market. In the NASDAQ, traders are able to submit bids/offers to a market specialist. The market specialist examines the bids/offers received and sets a price for buying and selling a particular share. For example, assume that the market specialist is collecting offers for a particular stock. After the specialist receives all the offers, the trade closes and the specialist may pick the lowest priced offer as the selling price. Thus, every offer submitted without a limit order is sold at that price. The price of orders is fixed between the times they are submitted and the time that trades are executed. That is, when the buyers or sellers submit their offers to the market specialist, they cannot submit an improved bid/offer until the next open trade. In addition, the buyers/sellers are not informed of the market price until after the market specialist selects a price. Thus, sellers may not be provided with the opportunity to gain improved prices over the current market price while the trade is active.

SUMMARY

In general, in a first aspect, the invention features a method for providing price improvement on an item being traded in an active market. A touch price for said item is provided. At least one price-improved order is received, the order having a price and a size, wherein said at least one price-improved order improves on said touch price. A price improvement indicator is displayed while said at least one price-improved order is available for trade in said active market. Each price-improved order is prioritized based on predetermined criteria. At least one transaction order is received, wherein said at least one transaction order is an order to buy or sell said item. The transaction order is filled based on the prioritization of said at least one price-improved order. At least a portion of the difference between said touch price and said price of said at least one price-improved order used to fill said at least one transaction order is distributed to (a) a trader associated with said at least one price-improved order, (b) a trader associated with said at least one transaction order; and (c) a system host.

In general, in a second aspect, the invention features a system for providing price improvement on an item being traded in an active market. Computer equipment is configured to (a) provide a touch price for said item; (b) receive at least one price-improved order having a price and a size, wherein said at least one price-improved order improves on said touch price; (c) display a price improvement indicator while said at least one price-improved order is available for trade in said active market; (e) prioritize each said at least one price-improved order based on predetermined criteria; (f) receive at least one transaction order, wherein said at least one transaction order is an order to buy or sell said item; (g) fill said at least one transaction order based on the prioritization of said at least one price-improved order; and (h) distribute at least a portion of the difference between said touch price and said price of said at least one price-improved order used to fill said at least one transaction order to (1) a trader associated with said at least one price-improved order; (2) a trader associated with said at least one transaction order; and (3) a system host.

Embodiments of the invention may include one or more of the following features. The computer equipment may be further configured to use a priority price-improved order to fill at least a portion of said at least one transaction order, wherein said first priority price-improved order is one of said at least one price-improved order that has been prioritized above all other said at least one price-improved order. At least one transaction order includes a specified volume for said item. The touch price may be set when a trader initiates trading for said item. The touch price may be an active market price of said item. A first trader may be provided with priority rights, wherein said first trader is the trader that provided said touch price. The priority rights may provide the first trader with an opportunity to temporarily stop said filling and allow said first trader to submit a new order. The computer equipment may be further configured to allow a trader to submit said at least one price improved order having said price that improves on said touch price by a predetermined price improvement level. The predetermined price improvement level may comprise a level that improves on a best price for said item currently available in said active market. The predetermined price improvement level may comprise a level that improves on the touch price by a user-defined quantity. The price-improved order may improve on other price-improved orders. The price-improved order may improve on a price of said item based on said market in which said traders are participating by decreasing the sale price, decreasing the buy price, increasing the sale price, increasing the buy price of said item, decreasing the offer price, decreasing the bid price, increasing the offer price, or increasing the bid price of said item. The computer equipment may be further configured to determine a difference between said at least one price-improved order price and said touch price to determine whether said at least one price-improved order is acceptable. The price-improved order price may be acceptable if said difference between said at least one price-improved order price and said touch price is below a maximum delta value. The computer equipment may be further configured to cease display of said price improvement indicator when none of said at least one price-improved order is available for said filling. The predetermined criteria may enable said prioritizing according to price of said at least one price-improved order. The predetermined criteria may enable said prioritizing according to a time in which each said at least one price-improved order was received. The computer equipment may be further configured to display said at least one price-improvement order based on said prioritizing. The computer equipment may be further configured to remove one of said at least one price-improved order when all of said size of said at least one price improved order is used to fill said at least one transaction order. The size of said at least one price-improved order may be displayed.

In general, in a third aspect, the invention features a method for improving the price of an item, said method being implemented in an electronic trading system. A trading stack is provided. A dynamic price improvement order to trade said item at an improved price is received. One of a plurality of price improvement levels is assigned to said order, said assigned price improvement level defining said improved price of said order such that said order is placed in a predetermined position within said trading stack. The position of said order in said stack is maintained until said order is matched or cancelled.

In general, in a fourth aspect, the invention features an electronic trading system for improving the price of an item, said system comprising a server that is configured to (a) provide a trading stack; (b) receive a dynamic price improvement order to trade said item at an improved price; (c) assign one of a plurality of price improvement levels to said order, said assigned price improvement level defines said improved price of said order such that said order is placed in a predetermined position within said trading stack; and (d) maintain said position of said order in said stack until said order is matched or cancelled.

In general, in a fifth aspect, the invention features an apparatus for implementing an electronic trading system. A plurality of workstations each comprise (a) a workstation storage device; (b) a workstation processor connected to said workstation storage device, said workstation storage device storing a workstation program for controlling said workstation processor; said workstation processor operative with said workstation program to receive a dynamic price improvement order to trade on an item at an improved price, and to display said order. A server is operative to communicate with said plurality of workstations and receive said dynamic price improved order. The server comprises (c) a server storage device; (d) a server processor connected to said server storage device, said server storage device storing a server program for controlling said server processor. The server processor operative with said server program to (e) provide a trading stack; (f) assign one of a plurality of price improvement levels to said order, said assigned price improvement level defines said improved price of said order such that said order is placed in a predetermined position within said trading stack; and (g) maintain said position of said order in said stack until said order is matched or cancelled.

Embodiments of the invention may include one or more of the following features. The server may be operative to adjust the price improvement level of said order to maintain said predetermined position. The server may be operative to increase or decrease the price improvement level. The server may be operative to adjust the price improvement level of said order to maintain said predetermined position. The predetermined position may be the front of said trading stack The adjusting may comprise decreasing the price improvement level. A timestamp may be assigned to said order, and the order position may be maintained based on said timestamp. In the event two or more said dynamic price improvement orders are received, the orders with older timestamps may be matched prior to orders with newer timestamps. Each one of said price improvement levels may represent a fraction of a predetermined pricing increment for which the price of said item is improved upon. Maintaining may comprise adjusting the price improvement level such that it is one level higher than the next best order in the stack, wherein the price improvement level can be adjusted up to a maximum price improvement level. Each price improvement level may represent a fraction of a predetermined pricing increment for which the price of said item is improved upon. The predetermined position may be position relative to other orders in said stack. The server may be operative to: (a) determine the price improvement level of a best order in said stack; and (b) assign a price improvement level to said dynamic price improvement order that exceeds the price improvement level of said best order by one price improvement level when the price improvement level of said best order is not a maximum price improvement level. The maximum price improvement level may be assigned to said dynamic price improvement order when the price improvement level of said best order is at said maximum price improvement level. The dynamic price improvement order may be the default price improvement order type for a predetermined number of traders. The dynamic price improvement order may be one of several price improvement order types selected by a trader using said electronic trading system. The price improvement level of at least one price improved order submitted subsequent to a dynamic order may be decreased, such that the price improvement level of the at least one price improved order does not exceed the price improvement level of the dynamic order. The price improvement level of the at least one price improved order may be decreased to a price improvement level one level below a maximum price improvement level when the at least one price improved order is submitted having the maximum price improvement level as its price improvement level.

In general, in a sixth aspect, the invention features a method for trading an item in an electronic market, the system operative to receive a plurality of orders. A trading stack is provided. A neutral order to trade an item at a standard increment price is received. A position size limit is assigned to the received neutral order. The received neutral order is maintained in a position in the stack based on the position size limit.

In general, in a seventh aspect, the invention features a method for trading an item in an electronic market. A trading environment is provided, capable of receiving a plurality of different types of orders to trade the item. A neutral order to trade at a predetermined pricing interval is received, the received neutral order having a position size limit that is equal to the total size of orders existing in a stack prior to receiving the received neutral order. The received neutral order is maintained in a position relative to other orders in the stack based on the position size limit.

In general, in an eighth aspect, the invention features a method for trading an item in an electronic market. A trading stack is provided. A plurality of orders of different types is received, including neutral orders, that are placed in the trading stack Predetermined trading rules are applied to all orders in the stack except for the neutral orders.

Embodiments of the invention may include one or more of the following features. Maintaining position of the neutral price improvement order in relative position may comprise preventing the total size of the orders existing in front of the received neutral price improvement order from exceeding the position size limit. The position size limit may be the total size of orders existing in the stack prior to receiving the received neutral price improvement order. A traditional order to trade the item at a standard increment price may be received. A price improvement order to trade the item at an improved price may be received. At least one order may be received prior to receiving the neutral order. The position size limit may be determined by summing together the size of each prior received order. The prior received orders may include traditional, price improvement, and neutral orders. The position size limit may be reduced by the size, or portion thereof, of an order in front of the neutral order when that order is matched. The total size of orders in front of the received neutral order may be prevented from exceeding the reduced position size limit. At least a portion of the size of an order received after the neutral order may be switched to be switched with at least a portion of the size of an order received prior to the neutral order, the switching being commenced within the confines of the position size limit. Market transactions of orders in the stack may be governed according to price improvement rules while preserving the position size limit of the neutral order. The price improvement order may be an order having a predetermined price improvement level or a dynamic price improvement order.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 2B is an illustration of another dialog window.
FIG. 12 shows an illustration of a market cell.
FIGS. 14-19 show examples of trading operations using neutral PI orders.

DESCRIPTION

I. System Overview

Figure 1A:
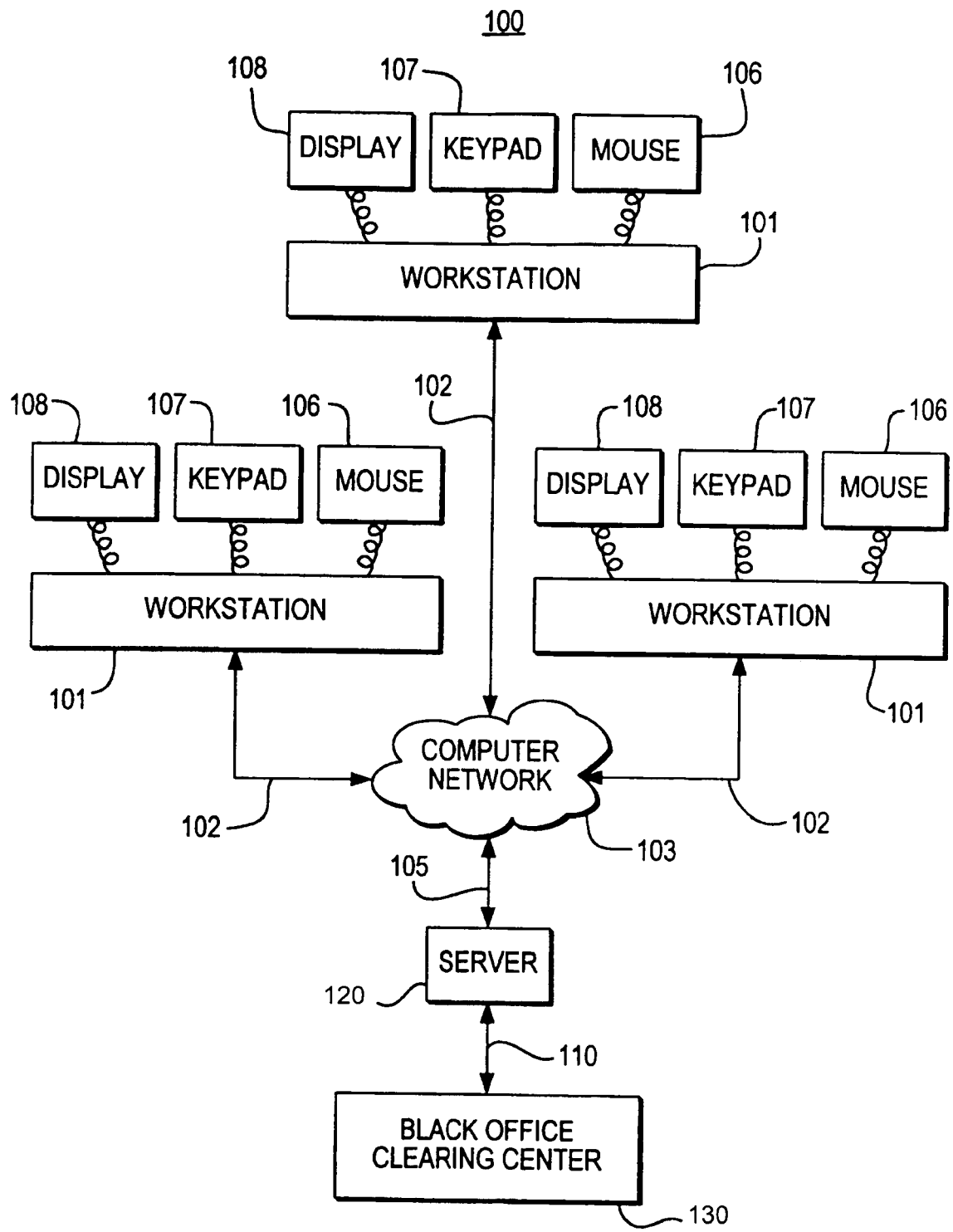
FIG. 1A is a block diagram of a computer system.

While there are markets that provide substantially direct trading between buyers and sellers, these markets do not provide an opportunity for buyers and sellers to improve prices on an actively traded item. Rather, these markets require traders to submit improved price orders in inactive markets.

Traders may want to submit price improved orders on an item currently being traded in a particular market. Traders may not want to wait until the trade closes before they can submit a bid. Accordingly, traders may be enabled to improve the current market price for a selected item in an active market. In particular, price improvement facilitates trading because the financial incentive for trading with price improvement benefits both the seller and the buyer.

Electronic trading systems provide a platform for which traders can trade items such as financial instruments (e.g., stocks, bonds, securities, futures, contracts, currency, etc.) or household goods (e.g., old records, antiques, sports cards, etc.). In many of these trading systems, bid/offer-hit/lift processes are used to negotiate a sale of a given item. In connection with such processes, traders may submit bids (i.e., prices they are willing to purchase an item) and/or offers (i.e., prices they are willing to sell an item). A trader may respond to bids or offers by submitting sell (or hit) or buy (or lift or take) commands to the trading system. A trade is executed when a trader issues a hit or lift (or take) command in response to a bid or offer, respectively. In other trading systems bids and offers may be automatically matched when at the same price.

The prices at which bids and offers can be submitted usually conform to some sort of fixed interval or increment, where the interval conforms to an established or agreed practice and is set by the trading system, or dictated by the type or price of item being traded. For example, if a trader is trading United States Treasuries in a brokerage trading system, that trader can submit bid or offer prices that some trading systems vary by ¼ of ¹⁄₃₂nd of a point in Treasuries up to a maturity of under 10 years, and ½ of ¹⁄₃₂nd of a point for maturities over 10 years and over. In trading systems for stocks and equities, for example, traders can submit bids and offers that vary by a penny. In some trading systems, if traders desire to submit bids or offers that are more competitively priced than other prices, they are limited to submitting bids or offers at the predetermined pricing intervals.

An electronic trading system may allow traders to submit orders with price improvement, the improvement being at an amount less than a predetermined pricing increment. The price improvement may be dynamic price improvement.

Trading systems have been developed that permit traders to submit bids or offers that improve on the price of a particular item by improving on the price within the predetermined pricing increments. Such trading systems employ a trading method commonly referred to as price improvement. Examples of trading systems that use price improvement can be found in U.S. patent application Ser. No. 10/826,779, filed Apr. 16, 2004, and in U.S. patent application Ser. No. 10/171,009, filed Jun. 11, 2002, both of which are hereby incorporated by reference.

In general, price improvement enables one or more traders to improve on a price for an item being traded in a market, without having to improve on the price using the predetermined pricing increment. Traders can improve on the price of an item using different price improvement levels. This allows traders to select among different aggressive price improvement increments to price improve, for example, on a bid, offer, buy, or sell price. For example, the trading system may provide several price improvement levels (e.g., four levels) for which the trader can improve the price. The trading system may use these price improvement levels to determine priority of orders in a stack of bids and offers, but not such that they warrant movement to a new standard predetermined trading price increment.

A price improvement level may improve on a particular price at a fraction of the predetermined pricing increment of the item being traded, with the particular price improvement level being a multiple of the fraction. The fraction of the standard increment may depend on the particular price improvement level chosen (e.g., a price improvement level of one, two, three, etc.). For example, the two-year United States government bond may trade at standard increments of $\frac{1}{4}$ of $\frac{1}{32}$ of a nominal value. Thus, trading two-year U.S. government bonds with price improvement enables a trader to submit an order that slightly improves on a price at a fraction of the ($\frac{1}{4}$ of $\frac{1}{32}$ for a 2 year maturity) predetermined pricing increment. Assuming for example that the price improvement increment is equivalent to one eighth of the predetermined pricing increment, a price improvement level of one may improve the price by one eighth of the ($\frac{1}{4}$ of the $\frac{1}{32}$) predetermined pricing increment, and a price improvement level of three may improve the price by three eighths of the ($\frac{1}{4}$ of the $\frac{1}{32}$) standard increment.

An order having a dynamic price improvement level may enable the order to change its price improvement level (e.g., the level may change from one to three to two) depending on market conditions. The dynamic price improvement level does not have a fixed price improvement level—it is dynamic. The price improvement level of the dynamic order can vary from a price improvement level of zero to the maximum price improvement level available. Thus, depending on market conditions, a dynamic price improvement level order may, for example, have a price improvement level of one at a first instance and a price improvement level of four at a second instance.

The dynamic nature of the price improvement level enables a dynamic order to maintain a predetermined position in a trading stack. A trading stack typically includes orders that have not been matched with a contra order. Generally, orders at the top of the stack are matched before orders at the bottom of the stack. Using price improvement, traders are able to submit price improved orders in an attempt to "jump" to the top of the stack so that their order will be matched before other orders in the stack.

Dynamic orders can modify their price improvement levels such that they maintain a predetermined position relative to other orders in the stack. For example, if a dynamic order is initially placed at the top of the stack, the dynamic order can change (e.g., increase) its price improvement level to maintain its position at the top of the stack when new orders are submitted with price improvement levels that exceed or match that of the dynamic order.

Dynamic orders may have a timestamp indicating the time at which the order is submitted to the trading system. The timestamp may be used to determine the dynamic order's position in the stack when its price improvement level is the same as another order and its price improvement level cannot be increased beyond the maximum price improvement level.

Use of price improvement may result in situations in which all bids or offers in the stack use price improvement, resulting in a stack arrangement that is the same as if the system does not have price improvement functionality. In some situations, traders may prefer to trade at standard pricing increments and not pay any price improvement increments to retain a certain position in a trading stack.

In other situations, traders may wish to participate in a trading system that uses a new feature such as price improvement, but would like to have an option to opt out of participating in the trading rules and/or scheme governing the new feature.

Traders may be enabled to improve on the price of a particular item within the predetermined pricing increments. Certain traders may be allowed to trade at the predetermined pricing increments, but also do not have their orders automatically passed over by price improved orders in a trading system that uses price improvement functionality. Traders may be allowed to opt out of being subjected to the trading rules and/or scheme governing a particular feature, yet still permitted to engage in competitive trading.

A trading system may allow traders to buy and/or sell items with price improvement and to submit price improved bids and/or offers.

Price improvement may enable one or more traders to improve on an existing market trading price. For example, consider a market in which several buyers and sellers are submitting bids and offers for a selected item at a predetermined price. Then one of those traders hits or lifts a bid/offer posted by another trader, thereby activating the active trader's side of the market for that item. The price at which the trader hit or lifted the bid becomes the "touch" price of the market. The touch price is the active market price for a selected item. Once a trade has been initiated, other traders may submit orders that improve on the touch price. When a trader submits a price improved order on a selected item, that trader may "jump in front" of other traders in a buying or selling stack. When an order is put on top of the stack, that order is in position to be executed (e.g., used to fill an order) first when a buyer decides to buy, or a seller decides to sell. A stack lists various order sizes for a particular item, and is typically arranged according to a predefined set of parameters.

Traders can submit price improvement orders that improve on the touch price by a predefined increment. A user may be able to improve prices at non-traditional increments. Markets typically trade goods at prices that can be exchanged in standard increments. For example the two-year United States government bond may trade at standard increments of $\frac{1}{4}$ of $\frac{1}{32}$ of a percentage point of a nominal value. A trader may submit a price improved order having a price that increases/decreases the touch price in some ratio smaller or other than the standard increment.

Traders may be allowed to price improve an item at price improvement levels. This allows traders to select among different aggressive price improvement increments for price improving a bid, offer, buy price, or sell price. In a buying/selling market, when a trader that submits an order with a price improvement level, the order improves on the touch price by that price improvement level. If desired, the trader can choose a BEST price improvement level. Submitting an order with a BEST price improvement level may automatically allow the order to jump in front of other prices in the market, including other price improved prices.

The maximum increment size of improved price orders may be limited. The delta (e.g., difference) between the touch price and the price improved price should be less than a maximum delta set by a trading system. If the delta is too big, then the trader's price improvement order is rejected. The maximum delta feature may be useful for preventing mistakes in which a trader may submit an erroneous order.

When traders begin price improvement of an item in an active market, a specified indicator may be displayed in a display screen to indicate to all traders participating in that market that price improvement is commencing. The indicator shows that a trader is trading a publicly known number of selected items at a price improved over the original first trader's price. Market participants, except the trader that submitted the price improvement order, may not be informed of the price of any price improved items listed in the stack. Market participants do know, however, that at least one item in the stack is price improved over the touch price. Therefore, if a trader places an order for at least the number of the items displayed on top of the stack, that trader will get that order at the touch price with price improvement.

When a trade is executed based on a price improvement order, the buyer and the seller may each receive a predetermined percentage (e.g., about half) of the difference between the touch price and the improved price. In addition, the system host (e.g., broker) may charge a nominal fee for providing the price improvement service.

The trader that initiated the first trade is awarded priority rights for activating a market. Priority rights may provide the first trader with an option to "hold up" the market after the first trader's order is cleared. That is, the trader is provided an opportunity to submit an order, if desired, before the system automatically proceeds down the stack to fill additional orders. Thus, priority rights may provide an incentive for a trader to initiate trading.

Traders may submit price improved bids and offers. That is, traders may be permitted to submit price improved bids and offers without having to buy or sell items substantially immediately.

Traders may be able to submit competitive prices during an active market. Because price improvement enables a trader to post a price that can obtain "priority" over other traders in the market, price improvement may provide an incentive for traders to trade their goods at more competitive prices.

An electronic trading system may permits traders to submit price improvement orders that are traded at predetermined pricing increments and that maintain a position in a trading stack based on the size of other orders already existing in the stack at the time the order is submitted. This type of price improvement relates to neutral price improvement.

Generally, neutral price improvement represents an option that permits a trader to opt out of being subjected to the trading rules and/or scheme governing a particular feature (e.g., price improvement), yet still permit traders to engage in competitive trading. For example, assume that a trader is participating in a trading system implementing the price improvement feature. In such a system, the price improvement rules may be applied generally to all orders in the system, except for orders submitted with the neutral price improvement option. That is, the neutral price improvement order operates according to non price improvement rules, but operates within a trading system that applies price improvement rules to other orders.

Neutral price improvement guarantees an order's position, with respect to size, in a trading stack regardless of the subsequent submission of any other order (e.g., price improved orders). Moreover, neutral price improvement enables a trader to also submit a neutral price improvement style order (or neutral order) that trades at the predetermined pricing increment, not at one of the price improvement levels used in connection with other price improvement orders.

II. Price Improvement in an Active Trading Market

Figure 1B:
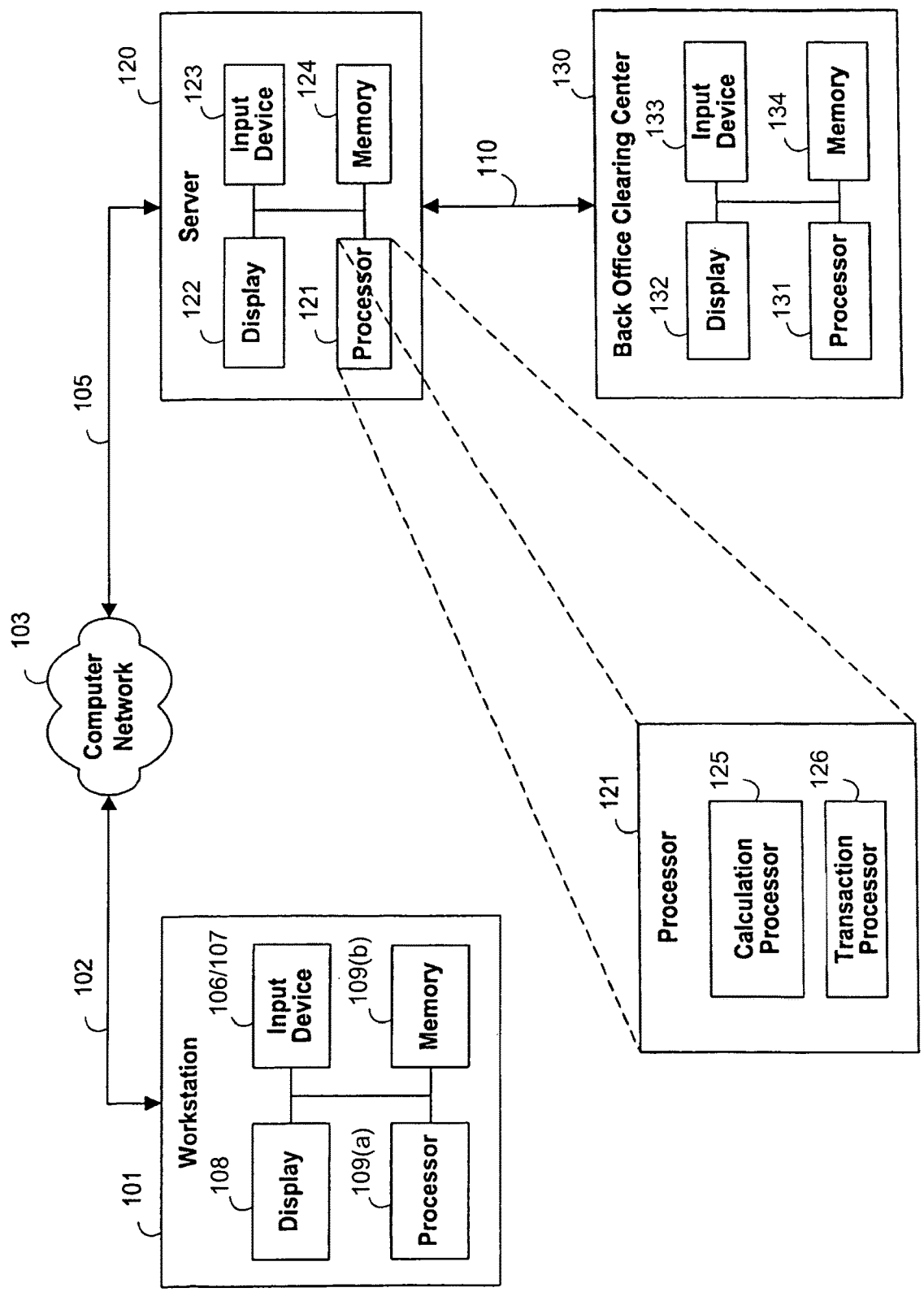
FIG. 1B is a more detailed block diagram of the system shown in FIG. 1A.
Figure 2A:
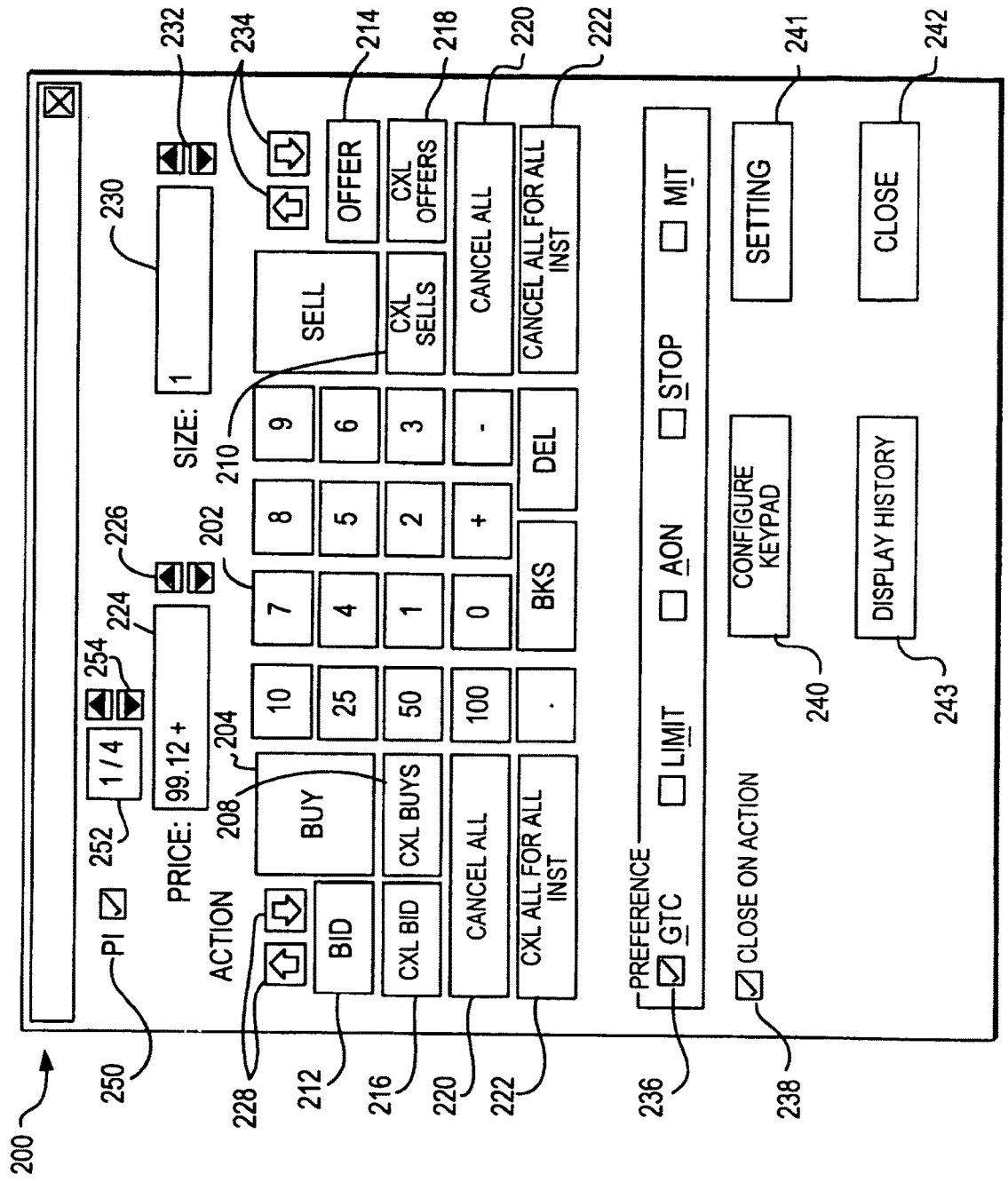
FIG. 2A is an illustration of a dialog window.
Figure 3:
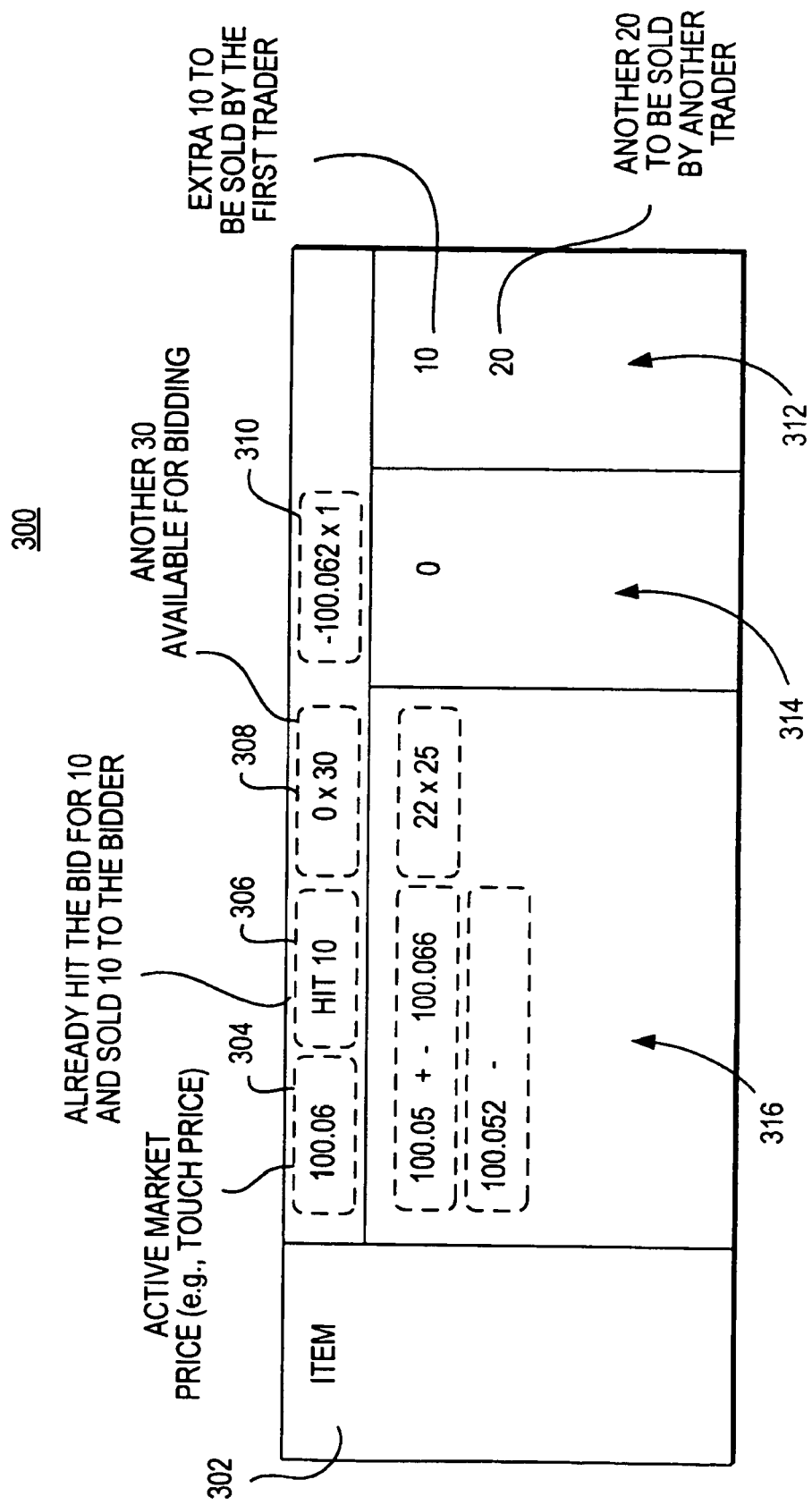
FIG. 3 is an illustration of a market cell.
Figure 4:
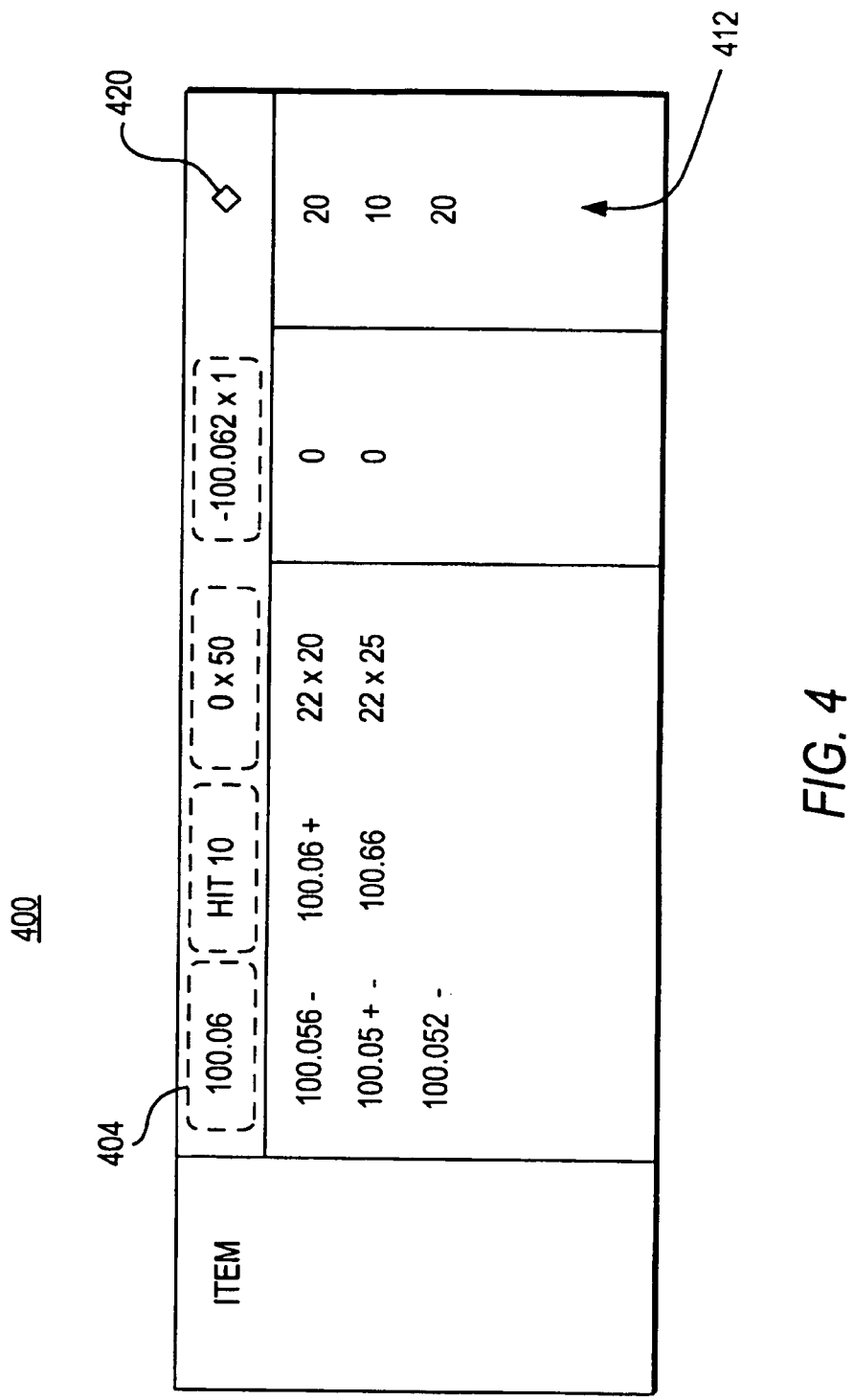
FIG. 4 is an illustration of a market cell showing price improvement.

FIG. 2A illustrates a graphical interface for submitting trading commands using, for example, a workstation as shown in FIG. 1. As shown, the graphical interface comprises a dialog window 200 with various buttons and entry fields 202-254. Using these buttons and entry fields, a trader may submit a bid command, an offer command, a buy command, or a sell command for an item corresponding to a market cell. A market cell is illustrated in FIGS. 3 and 4. Preferably, each traded item uses a unique dialog window 200. Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular instrument below the market cell 100 for the same tradable item. The number of dialog windows 200 that can be kept open at any one time is preferably unlimited.

As shown in FIG. 2A, dialog window 200 may comprise a variety of on-screen buttons and entry fields. Generally, a button, as displayed in box 200, may be "pushed" by placing a pointing device's pointer over the button and pressing a switch on the pointing device. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232. Finally, dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, a settings button 241, and a display history button 243 that causes a history list of order entries to be display when pressed.

Preference field 236 may be used to indicate the user's preferred trade type and may allow the user to select any type of trade that a particular exchange or trading system supports. Although FIG. 2A provides specific examples of trade types (e.g., good-till-canceled (GTC), limit, all-or-none (AON), stop, and market-if-touched (MIT)), price improvement may be implemented with any type of trade.

Configure keypad button 240 may allow a trader to arrange buttons appearing in dialog window 200 to be anywhere a trader prefers by first pressing the configure keypad button 240, by then dragging the buttons to new positions, and finally by clicking on button 240 again. Also, the configuration or re-configuration of buttons can change the function of those buttons depending on the type of trading desired or what type of item is being traded.

Dialog window 200 also may include price improvement field 250. Price improvement box 250 may be selected by a user by moving a pointer over box 250 and pressing a button. As illustrated in FIG. 2A, price improvement is active because box 250 contains a checkmark. When price improvement box 250 is selected, a trader may be able to submit price improvements orders for items traded in a particular market.

If price improvement is enabled, a trader may enter an increment (e.g., a fraction) suitable for price improvement in field 252 using up and down buttons 254. The number provided in field 252 may be used as an increment to improve the price of a known price currently traded in a market. For example, if a current selling price is 106.06, a trader may improve the price by adjusting field 252 such that a price improvement of 106.056 is obtained.

A user may submit price improvement orders using dialog window 200. In particular, a user may enter desired values in price improvement field 252 and size field 230 when executing price improvement orders. The value entered in price improvement field 252 represents the fraction of a market's standard increment that is used to provide price improvement of a touch price. (A touch price is price at which a trader initiated trading for a selected item.) For example, assume that the user is trading in a market that provides standard increments of $1/128$ of a point (e.g., "1"). Depending on the value entered in field 252, the user can improve prices at a ratio of the standard increment. Thus, if a user enters ¼ in field 252, the user has configured dialog window 200 to submit an order that has a price improvement of $1/512$ (i.e., ¼ of $1/128$) of a point. Non-traditional increments to enable price improvement may be enabled.

In addition, the user may also select a desired number of selected items for trading by entering a value in size field 230. After a user has entered desired values in price improvement field 252 and size field 230, the user may submit an order by pressing, for example, buy 204, sell 206 or any other suitable key in dialog window 200. Once the order is submitted and approved, the price improvement order is displayed in a market cell for a particular market.

United States patent application publication No. 2002/0029180 (application Ser. No. 09/745,651) published Mar. 7, 2002, which is hereby incorporated by reference, provides further description of dialog window 200.

Traders may be permitted to price improve an item at different price improvement levels within a defined price range. This provides the traders with an opportunity to submit bids, offers, buy orders, and/or sell orders that enables a trader to "jump in front of" other traders by improving on an existing price. As defined herein, a price can be associated with a sell price, a buy price, a bid price, and/or an offer price. For example, assume that the defined price range for an item is 1.00 (i.e., the price of an item can vary in increment of 1.00 such as 3.00, 4.00, 5.00, etc.). Also assume that traders can price improve at levels such as BEST, 0.25, 0.5, and 0.75, which is shown in FIG. 2B at price improvement box 262.

If the trader submits an order with a price improvement level of BEST, the system submits a price improved price that improves on the best price currently available in market. The BEST price improvement level allows a trader to automatically jump in front of the other traders. The BEST price improvement order may increase the order price at any suitable improvement level (e.g., 0.25, 0.50, 0.75, etc.) that is more aggressive (i.e., has a better price) than the price at the top of the stack. The BEST price improvement may increase the order price up to a predetermined limit.

If the trader submits an order with a price improvement level of $2/16$, then the system submits a price improvement bid that improves on touch price by $2/16$th. This type of price improvement submission, however, may not put the trader in front of the stack because the submitted price may not improve on the price listed at the top of the stack.

Figure 2B:
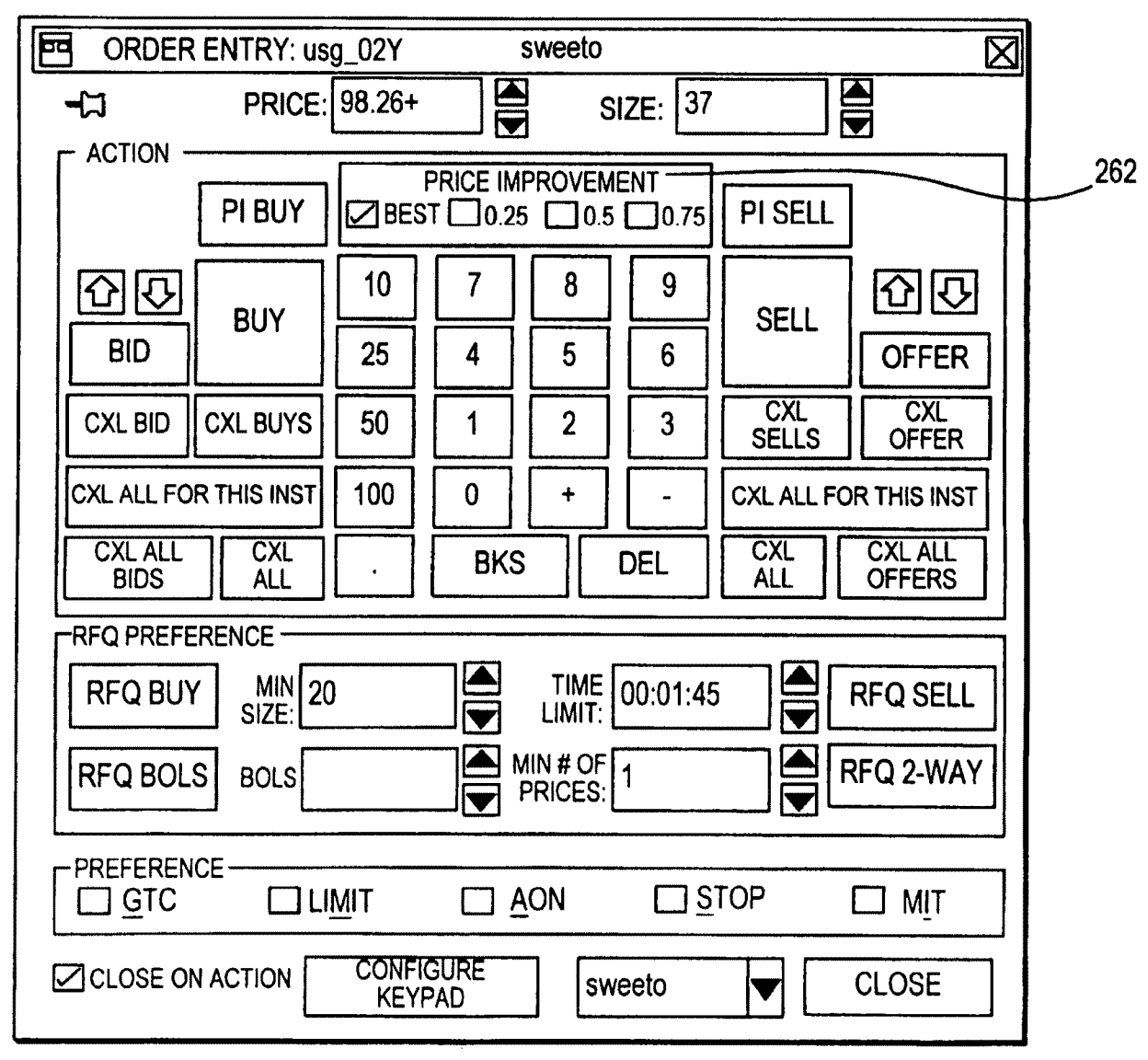

The above discussion related to FIGS. 2A and 2B can also be applied to price improving bids and offers in a non-trade state. That is, instead of price improving a buy or sell price, a trader can price improve on a bid or offer. Traders can use, for example, the dialog windows of FIGS. 2A and 2B to price improve bids and/or offers at non-standard increments and at different price improvement levels.

Figure 5:
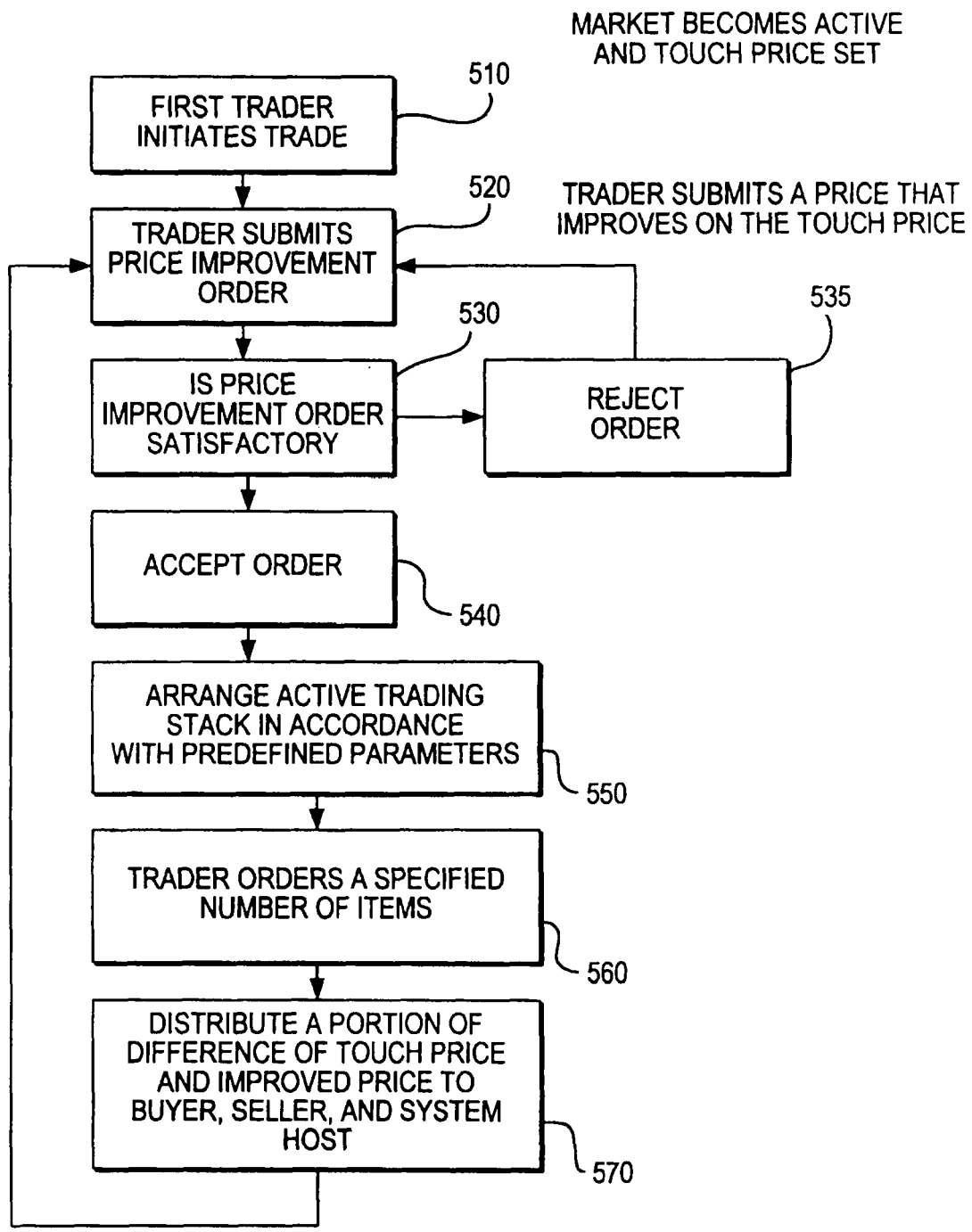
FIG. 5 is a flow diagram of a process that may be used to provide price improvement.
Figure 6:
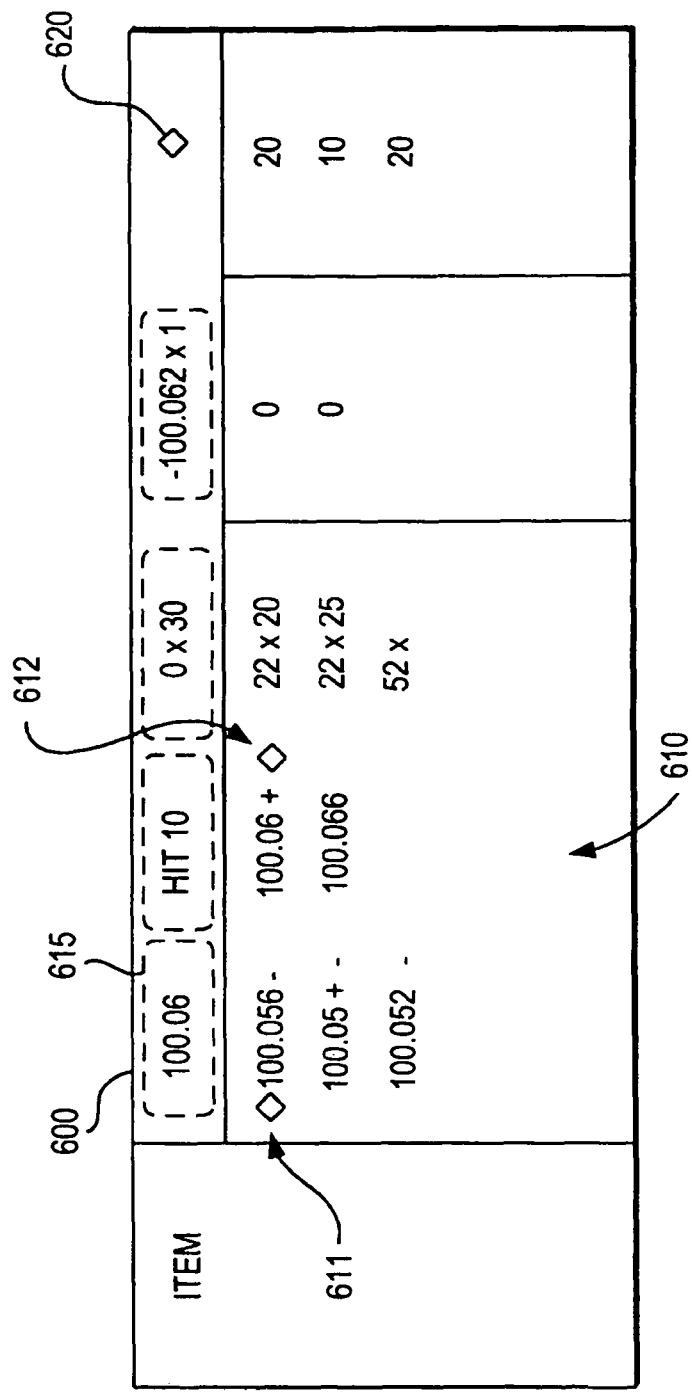
FIG. 6 is an illustration of a market cell in which unfilled price improved orders from the trade state are about to be returned to a bid/offer state.
Figure 7:
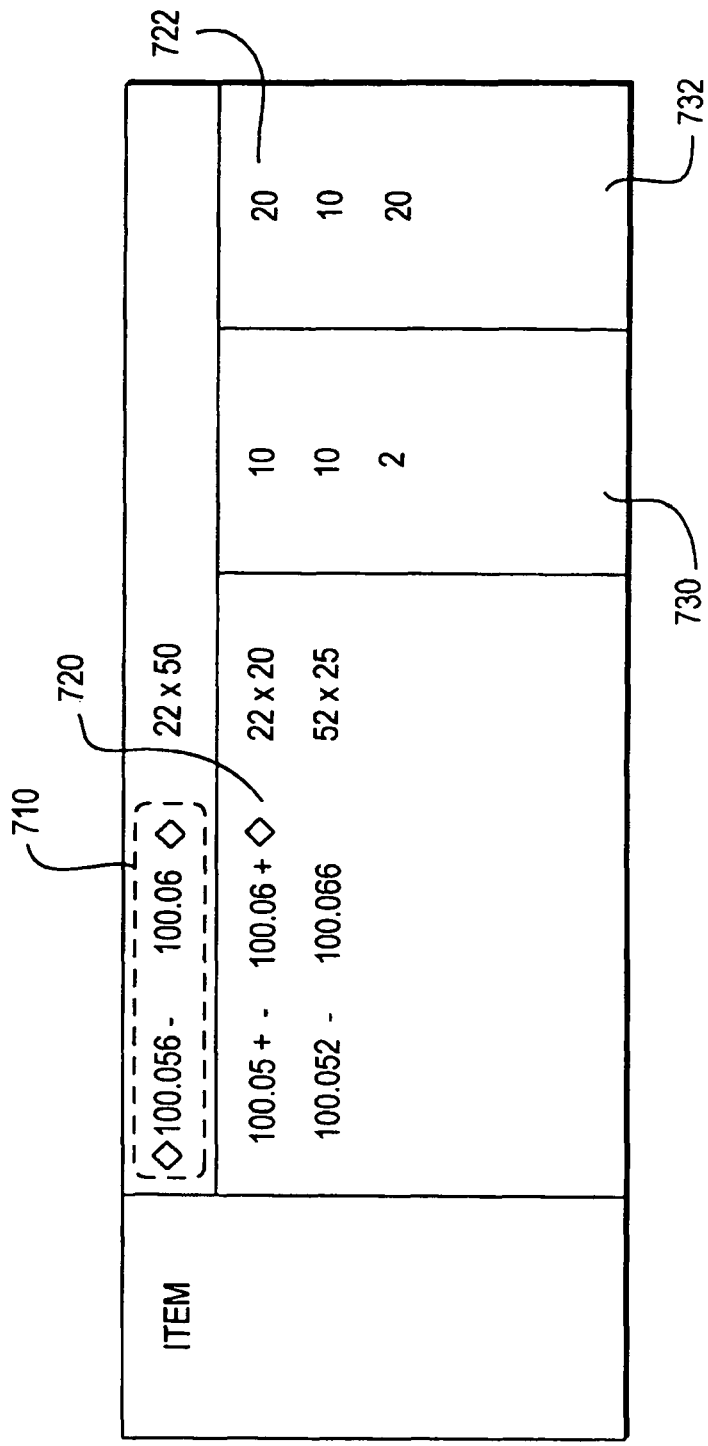
FIG. 7 is an illustration of a market cell in which price improvement is applied to a bid/offer state.

With reference now to FIGS. 3 and 4, price improvement is described in context of market cells 300 and 400 for a selected item. FIGS. 3, 4, and 5 are described primarily in the context of a trade state in which traders are actively buying and selling an item by submitting buy and sell orders. FIGS. 6 and 7 are described primarily in context of a bid/offer state in which traders submit bids and offers for an item. Price improvement features can be used in conjunction with trade states and bid/offer states.

FIG. 3 shows an exemplary market cell 300 in which a trader has initiated trading. Market cell 300 shows that the user is participating in a market in which selected item 302 is being traded. Selected item 302 may be any suitable type of commodity such as, for example, securities, bonds, coupons, etc. Price 304 indicates the current selling and/or buying price of selected item 302. Trade status 306 provides an indication of what type of trading activity is taking place with respect to selected item 302. Item indicator 308 provides an indication of the quantity of selected item 302 available in the market. If, for example, sellers are operating in the active side of the market, the item indicator 308 informs market participants the total number of items 302 that are available for sale in the market. Market ticker 310 provides an indication of the price at which selected item 302 was previously being bought or sold. Seller stack 312 informs market participants the quantity of selected items 302 a particular seller is prepared to sell. Likewise, buyer stack 314 informs market participants the quantity of selected items 302 a particular buyer is prepared to buy. Market spread indicator 316 provides information regarding the depth of the market (i.e., the price and quantity of items available in the market, at prices different to the touch price).

As discussed herein, an improved price is a price that is better than the touch price. A better price, however, is dependent on whether the participant is a buyer or seller. If the participant is a buyer, then a better (more aggressive) price is higher. If the participant is a seller, a better (more aggressive) price is lower. Both the buyer's market and the seller's market can be active simultaneously. "Improved prices" can be dependent on a particular type of market. In a yield market, for example, a seller's action can be improved on by submitting a price higher then the touch price.

As mentioned above, FIG. 3 provides an illustrative display of market cell 300 after a trader initiates a trade in a market. In connection with the following discussion of FIG. 3, sellers are participating in the active side of the market. Therefore, the discussion of FIG. 3 is presented from a sellers point-of-view. Price improvement need not be limited to only improving selling prices; price improvement features may be provided for both buying and selling prices.

Prior to the initial trade, market participants are aware of the bids and offers available in the market for selected item 302. If desired, a trader may "HIT" a bid or "LIFT" an offer to start trading. FIG. 3 shows that a trader "HIT" a bid, as indicated by trade status 306, at price 304. In this example, assume that this seller HIT a bid for 10 million (hereinafter "M") by selling 20m into that bid. Because this trader is selling 10 m more items than the buyer bid, the extra items are displayed in seller stack 312. After this trade commences, all market participants are aware that a seller sold 10 m selected items 302 at price 304. Market participants also know that there is an additional 30 m selected items 302 available for purchase, as indicated by item indicator 308. There are 30 m items 302 available because another trader (or the first trader) has submitted an order to sell 20 m items 302 at a predetermined price.

After a trader initiates trading for selected item 302, other traders may submit price improved orders that improve prices with respect to the touch price. FIG. 4 illustrates a market cell 400 in which price improvement is commencing. Market cell 400 has substantially all the same features of market cell 300. In addition to the features of market cell 300, market cell 400 displays price improvement indicator 420 when price improvement is taking place in the market. Price improvement indicator 420 may be any suitable distinguishing character such as, for example, a diamond, a caret, text (e.g., PI) or other distinguishing mark. Price improvement indicator 420 informs all market participants that at least one seller is selling a specified number of items at an improved price. That is, the seller is selling items slightly cheaper than price 404. But market participants (except the trader who submitted a price improved order) do not know how much cheaper the items are being sold.

As shown in FIG. 4, a second trader placed a price improved order for 20 m items. This 20 m is shown at the top of seller stack 412, which is on top of the first trader's 10 m. Price improvement may enable the second trader to submit an order that takes precedence over the first trader because the second trader is offering items at an improved price. Thus, when a buyer decides to purchase a specified number of items, the second trader's items are used first to fill the buyer's order. For example, if a buyer decides to place a relatively small order, this provides an incentive for sellers, especially when there are several sellers, to submit price improved orders.

During price improvement, market participants may not be aware which items in stack 412 are price improved. Granted, a price improved item may be displayed on the top line of the stack (when the stack is arranged according to price priority) when price improvement display 420 is displayed. This is because the seller is offering the cheapest price. But most market participants do not know if other items in stack 412 are price improved.

Although FIG. 4 shows three orders of items in stack 414, price improvement need not be limited to permitting only one other trader to submit a price improved order. Any suitable number of traders may submit price improved orders when the trade is working. If desired, the same trader may submit several price improved orders in the same market. For example, the same trader may use different price improvement levels to submit different price improved orders.

Price improvement process 500 may be used to provide price improvement as illustrated in FIG. 5. As shown in FIG. 5, process begins at step 510 when a trader initiates (e.g., sells or buys an item). It should be noted that prior to step 510, traders are posting bids and offers for a particular item, thereby attempting to provide a favorable trading environment to initiate trading.

A trader that initiates trading in a market may be awarded priority rights during an active trade. Priority rights may provide the first trader with the ability to "hold up" the market for a specified period of time such that the first trader has the option to sell more items. This "hold up" option is advantageous because it enables the first trader to submit a new order after the first order is cleared. Regardless of whether the first trader takes any action, the first trader's rights may be revoked after a predetermined period of time.

After a trader initiates a trade (e.g., trader HITS a bid as in FIG. 3), process 500 proceeds to step 520. At step 520, a new trader may submit a price improvement order using, for example, dialog window 200 of FIG. 2A. As mentioned above, any suitable number of traders may submit price improvement orders at any time during process 500. That is, a trader may submit a bid at any time trading is open in that particular market. Moreover, a trader may submit more than one price improvement order for a particular market.

After a price improvement order is submitted, it may be scanned to determine whether it is acceptable before it is displayed in a market cell. At step 530, process 500 may determine if the proposed price is acceptable. In particular, the difference between the price improvement price and the touch price (e.g., price at which trading was initiated) is compared to a maximum delta limit. Maximum delta limits are imposed to minimize potential trader mistakes. If a trader submits a price improvement order that aggresses too far from the touch price, the order may be rejected at step 535. If the price improvement order is acceptable, it is accepted at step 540. An accepted order is an order that is deemed to be acceptable by the system processing the orders. Once accepted, the trader's order may be displayed in a market cell (e.g., market cell 400 of FIG. 4). In addition, if the price improvement order is accepted, a price improvement indicator may be provided in a market cell to indicate to market participants that price improvement is occurring in a particular market.

After a price improvement order is accepted, the process determines how the order is displayed in a market cell. At step 550, the process arranges the accepted order in an existing stack according to a set of parameters. For example, new orders may be arranged according to price of the order and time the order was submitted. The better the price, the higher in the stack the order is placed. If an order includes the best price, then the order is place in the top of the stack. If an order has the same price as an existing order, then the order is arranged according to the time it was it was submitted by the trader. Older orders may have precedence over newer orders (i.e., older orders are arranged above newer orders having the same price). The aggregation of orders enables the trading system to determine which orders should be used first to fill a buyer's order. Thus, orders on top of the stack are used first and other orders are used in a top-down approach.

At step 560, when a buyer places a buy order for a specified number of items, a trading system automatically fills that buy order with accepted orders in the prioritized aggregated stack. Accepted orders that are used to fill a buyer's order are cleared and the remaining orders are pushed up the stack.

At step 570, if a buyer bought a price improved order (e.g., a price improved order), the process determines how the difference between the touch price and the improved price is distributed. In general, the process may determine the midpoint of the difference and provide about one half of the difference to both the buyer and seller, respectively. The system host may charge both the buyer and the seller a nominal fee for providing this service (e.g., price improvement trading). The difference may be divided up in any suitable manner. For example, the fee charged by the system host may also vary.

The process may determine how to distribute the difference with respect to each order cleared from the stack. For example, assume that a buyer placed an order to buy 30 million items (hereinafter million is referred to as "m") in a market that had a selling stack of at least a 20 m order and a 10 m order. To fill the buyer's order, both the 20 m and 10 m orders are used. But the prices for the 20 m and the 10 m items may be different due to price improvement on only one of them. With respect to the 20 m order, an improvement in price may be distributed between the buyer and the seller of the 20 m order. With respect to the 10 million order, there may be no improvement between prices or may be a different improvement than the improvement for the 20 m order. This different improvement may be distributed between the buyer and the seller of the 10 m lot. After the difference in price is distributed to the respective parties, process 500 may return to step 520.

Certain steps of process 500 may be repeated while the market is active. For example, several traders may submit new orders and buyers may place orders any time the market is active.

Traders may be allowed to submit price improved bids and offers without having to buy or sell items substantially immediately. FIG. 6 shows an illustrative display of market cell 600 in which bids and offers worse than the touch price may be present. A price improved bid 611 and price improved offer 612 may be displayed in a stack 610 below and above the touch price trading 615. Touch price 615 itself may be subject to price improvement in the trading state as indicated by indicator 620. If more than one price improvement bid or offer is displayed in bid/offer stack 610, then the best bids and offers are aggregated at the top of their respective stacks. Likewise, as described above, all bids and offers may be prioritized according to price.

FIG. 7 shows illustrative market cell 700 in which a bid/offer state is being implemented. Price improvement can also be present when unfilled price improved orders from the trade state are returned to a bid/offer state. Certain price improvement orders may not be filled in the trade state. Such price improvement orders may be returned above the bid/offer stack 720 as the best bid and offer display 710. In addition, the price improvement indicator may also be displayed to indicate that a bid or offer is available that is price improved on the touch price. Moreover, any order properties such as preferences (e.g., Good until cancelled, Limit, etc.) may be carried over to the bid/offer state.

For example, price improved bid and offer 710 indicates that an improved bid and offer is available. In particular offer 720 is available at a price improved offer (e.g., an offer that improves on 100.06) that has size 722 (e.g., 20). Each trader participating in market cell 700 knows that is an offer with price improvement. The traders also know the size of the price improved offer, but other traders may not know whether other sizes in the size breakdown stacks 730 and 732 are associated with a price improved offer or bid.

III. Dynamic Price Improvement

As defined herein, price improvement refers to the ability to submit orders that improve on a price for a particular item at an amount less than a predetermined pricing increment. A predetermined pricing increment is typically defined by the instrument being traded. For example, the two-year United States government bond may trade at predetermined pricing increments of ¼ of ¹⁄₃₂ of a nominal value. Thus, in conventional trading systems, a user has to submit a traditional order, which varies in price only by the predetermined pricing increment.

In a trading system that uses price improvement, traders can submit price improved orders that improve on the price at fractions of the pre-determined pricing increment. For example, a trading system may include three levels of price improvement in which a trader can improve the price. If a trader submits an order with a price improvement level of one (e.g., the first level of price improvement), that order improves on a predefined price (e.g., price at which an item is being traded or a price submitted in response to a request for quote) by a predefined fraction of the predetermined pricing increment. A price improved order with a price improvement level of two (e.g., the second level of price improvement) improves on the predefined price by twice the predefined fraction of the predetermined pricing increment. Note that the number of price improvement levels is not limited to a particular number of levels, and that a predetermined number of levels can be used.

The foregoing discussion is not meant to be thorough discussion of price improved orders, but merely an illustrative discussion that sets forth the framework in which dynamic price improved orders may operate. A detailed description of price improved orders can be found, for example, in U.S. patent application Ser. No. 10/171,009, filed Jun. 11, 2001.

Another price improvement level includes use of dynamic BEST price improvement level (hereinafter "dynamic price improvement"). Orders submitted using dynamic price improvement maintain a predetermined position within a trading stack until matched or cancelled. For example, if the dynamic order is placed on top of the stack, it remains at the top of the stack until it is matched or cancelled. A dynamic price improvement order has a price improvement level and a timestamp. The price improvement level is a non-traditional price improvement on a traditional price increment such as the level one, two, or three price improvement level, as discussed above. The timestamp indicates the time at which the dynamic order is submitted, and may be used to establish priority over other orders that have the same price improvement level, including other dynamic orders.

Figure 8:
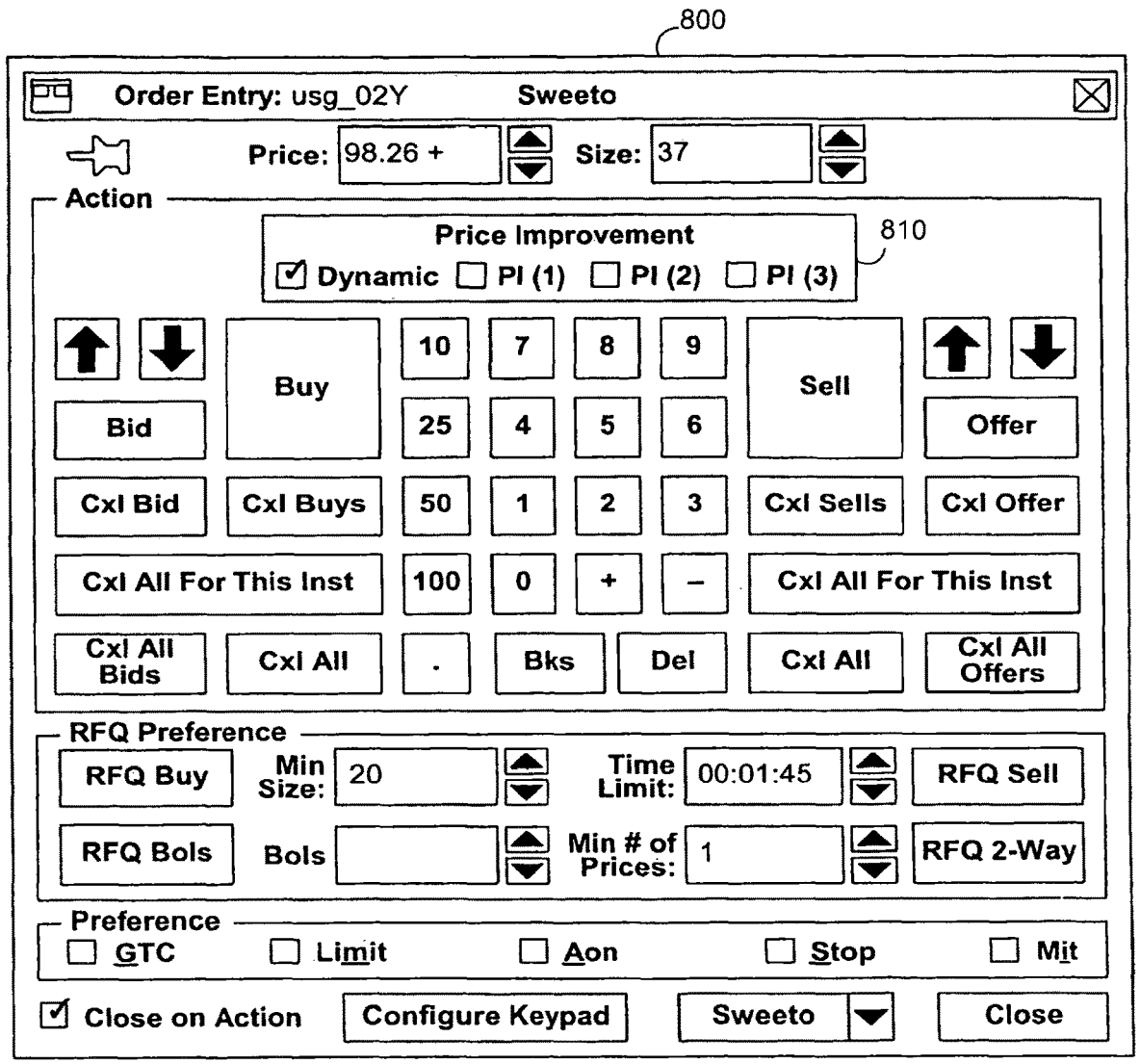
FIG. 8 is an illustration of a dialog window.

FIG. 8 illustrates a graphical interface 800 for submitting trading commands using, for example, a workstation as shown in FIG. 7. Interface 800 includes price improvement trading box 810, which has first, second, and third price improvement level options and a dynamic best price improvement option that can be selected by the trader. If a trader wishes to trade with dynamic price improvement, the dynamic price option in box 810 can be selected.

In trading systems where the dynamic price improvement is default, the dynamic price option in box 810 may be selected automatically. Alternatively, price improvement box 810 may not be displayed when the dynamic price improvement level is default.

The above description with respect to FIG. 8 is not intended to be an exhaustive description of various features that can be included with dialog window 800. United States patent application publication No. 2002-0029180 published Mar. 7, 2002, which is hereby incorporated by reference in its entirety, provides a substantial description of dialog window 800.

Price improvement trading can be implemented with a variety of trading schemes such as, for example, Direct Dealing (hereinafter "DD") (sometimes referred to as "Request for Quote" style trading) and traditional market style trading. In DD style trading, there are requestors and responders. The requestors can enter a request for prices on a particular item or instrument. A responder may submit prices in response to that request. The requestor may then choose to trade with one of the responders. Responders may be enabled to use dynamic price improvement to improve on the prices submitted in response to the request, thereby enhancing the position of the improving trader relative to the other responding traders (i.e., the requesting trader may be more likely to accept the dynamically improved quote over the other responder's non price-improved quotes).

Traditional market style of trading enables traders to submit bids and offers for a particular item. Traders can hit a bid or lift an offer to commence trade. Traditional market style of trading may also enable traders to submit buy and sell orders Traders may use dynamic price improvement to improve on bids and offers, and buy and sell orders that are being traded in a market.

A dynamic price improved order can increase or decrease its price improvement level depending on market conditions. This creates a trading scheme in which the dynamic order changes its price improvement level to maintain its position relative to the other orders in the stack, thereby maintaining its position in the stack. For example, if a trader submits a dynamic order and that order is placed at the top of the stack, this order maintains its position at the top of the stack, while the price of the item being traded is maintained at its predetermined price increment price, by adjusting its price improvement level (e.g., increase its price improvement level such that it exceeds the price improvement level of the next best order by one level) until it is matched with a contra order or cancelled.

The dynamic order may increase its price improvement level up to a maximum available price improvement level, at which point it may use its original timestamp to maintain its position at the top of the stack where the timestamp is older than subsequent orders.

The presence, or not, of dynamic price improvement (PI) orders in the stack may cause the system to decrease the price improvement level of certain price improved orders submitted subsequent to dynamic PI orders such that the price improvement level of the dynamic PI orders are not inflated when such inflation is not needed to maintain their respective positions in the stack. Thus, this avoids using unnecessary price improvement levels on orders that cannot improve their position in the stack by virtue of the pre-existing dynamic price improvement order. For example, assume that a dynamic order is in a stack with a price level of two. Then a trader submits a new price improved order with a price improvement level of three, which in this case is assumed to be the maximum price improvement level. Instead of increasing the price level of the dynamic PI order to three, the system may decrease the price level of the new price improved order to two. This way, the dynamic PI order still maintains its position in the stack, but does not have its price improvement level increased to three. Thus, such functionality prevents unnecessary inflation of price improvement levels.

The trading system may or may not provide traders with the option of selecting which price improvement level they wish to trade. For example, users may be permitted to select a specific price improvement level such as a price improvement level of one or the dynamic best price improvement level. This results in orders being arranged in a stack according to their respective price improvement levels and timestamps by default without user intervention.

In some cases, price improvement orders being submitted by predetermined traders may, by default, be dynamic price improved orders. The system may select which traders' orders are default price improved orders or the traders themselves may choose to have their price improved orders by dynamic price improved orders by default.

Figure 9:
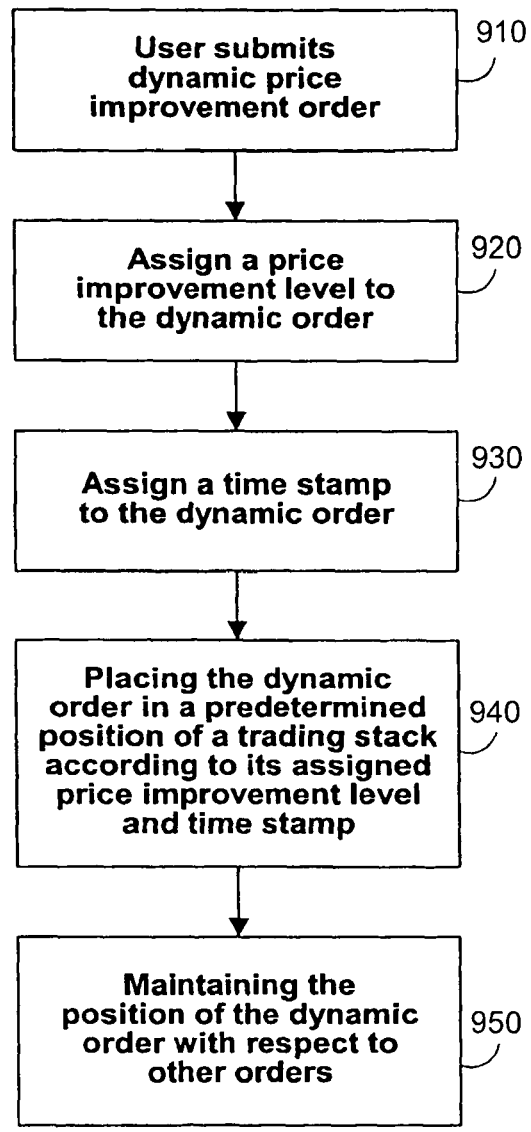
FIG. 9 shows a flowchart of submitting a dynamic price improvement order in a trading system.

FIG. 9 shows a flowchart 900 that illustrates use of a dynamic price improvement order. Starting at step 910, a user submits a dynamic price improvement order using, for example, a dialog window 800 of FIG. 8. At step 920, the trading system assigns a price improvement level to the dynamic order. The assigned price improvement level may depend on factors including, but not limited to, orders currently in the stack, the price improvement level of orders in the stack, other dynamic orders in the stack, and the timestamps of orders in the stack.

For example, if the dynamic order is the first order to be submitted, the system may initially assign that order a price improvement level of zero. In the case where orders already exist in the stack, but the orders are not dynamic orders, the system may assign a price improvement level that is one level higher than the highest price improvement level associated with any of the existing orders. For example, if the stack has an order with a price improvement level of one (but is not a dynamic order), the dynamic order may be assigned a price improvement level of two. If the price improvement level of the best order in the stack is at the maximum price improvement level, then the maximum price improvement level is assigned to the dynamic order.

If a dynamic order already exists in the stack, the trading system may assign the price improvement level of the existing dynamic order to the newly submitted dynamic order. This suppresses the price improvement level of a newly submitted dynamic order to prevent inflation of the price improvement level of the dynamic order already present in the stack. The price improvement level is suppressed because the new dynamic order cannot jump in front of an existing dynamic order because of the existing order's timestamp. However, in the event the existing dynamic order is the lone order in the stack, in which case the price improvement level of the existing order is zero, the price improvement level of the existing dynamic order and the new dynamic order is increased to one, thereby promoting the advantageous use of dynamic price improvement to reward the counter party and to promote dynamic price improvement. (The reward provided to a trader for trading with dynamic price improvement is discussed below.)

At step 930, the system may assign a timestamp to the dynamic order. The timestamp indicates the time at which the dynamic order is submitted to the system and may be used to determine the particular position an order has in a stack. For example, in instances where two or more dynamic orders are submitted, the timestamp determines which order takes precedence. Note that dynamic orders may retain their original timestamp even if its price improvement level changes.

Proceeding to step 940, the system places the dynamic order in a predetermined position of a trading stack according to its assigned price improvement level and timestamp. The predetermined position may be relative and may change depending on market conditions such as submission of new orders (e.g., dynamic orders and price improvement orders), and the matching of orders, and cancellation of orders. A predetermined position is defined herein as the position a dynamic order has in a stack with respect to previously submitted orders and to subsequently entered orders. For example, if a price improved order having a maximum price improvement level is submitted before a dynamic order, the dynamic order is assigned a maximum price improvement level and may be placed below the price improved order because the price improved order has an earlier timestamp.

At step 950, the system maintains the dynamic order in the predetermined position with respect to previously submitted orders and to subsequently submitted orders. For example, if a dynamic order's predetermined position is second from the top of the stack, that order will remain second until the first order is cancelled or matched with a contra order. At this point, the predetermined position of the dynamic order shifts from being second to first (e.g., its new predetermined position). This order preferably remains first until matched or cancelled.

To maintain the dynamic order in a predetermined position, the trading system may change the price improvement level. The trading system may increase the price improvement level to maintain the order's position in the stack when an order having a price improvement level higher than the level of the dynamic order is submitted. If the price improvement level increases to the highest available level, then the system may use time priority to keep the dynamic order in its predetermined position.

Figure 10:
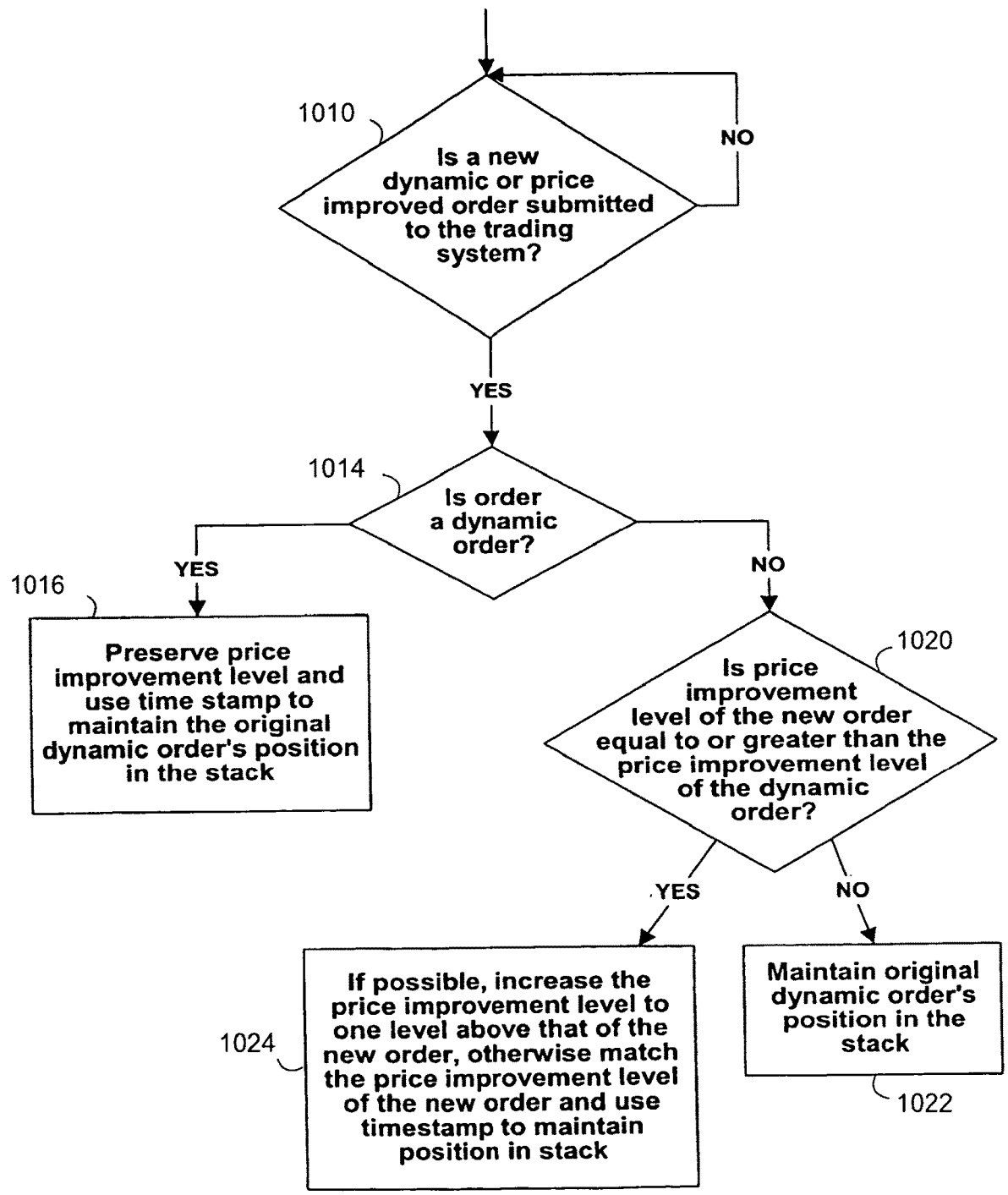
FIG. 10 shows a flowchart of how the trading system maintains a dynamic order in a particular location in a trading stack.

FIG. 10 shows a flowchart illustrating steps that may be taken to maintain the position of a dynamic order when a new order (e.g., either a dynamic order or price improved order) is submitted. In the context of this flowchart and for the purpose of clarity, the existing dynamic order is referred to as the original (dynamic) order.

Beginning at step 1010, the system checks if a new dynamic or price improved order is submitted to the system. The system may continue to perform this check (as indicated by the feedback loop) until a new order is actually submitted, at which point the process advances to step 1014. At step 1014, a determination is made as to whether the new order is a dynamic order. If the new order is a dynamic order, the process proceeds to step 1016, which preserves the price improvement level of the original order and uses the timestamp of the original order to maintain its position in the stack.

If the new order is not a dynamic order, the process proceeds to step 1020. At step 1020, the process determines whether the price improvement level of the price improved order is equal to or greater than the price improvement level of the original order. If not, then the system does not change anything with respect to the original order and it maintains its position in the stack, as indicated by step 1022. However, if the price improvement level of the improved order equals or exceeds that of the dynamic order, the process proceeds to step 1024. At step 1024, the system may increase the price improvement level of the original order to a level (e.g., one level) above the level of the price improved order, if possible. Increasing the price improvement level of the original order ensures that the original order maintains its position in the stack. If the price improvement level of the original order cannot be increased to a level above the improved order's level, the system may match the price improvement level of the original order to the improved price order's level and use the timestamp of the original order to maintain its position in the stack.

FIG. 10 is merely illustrative, and additional steps may added or some steps may be omitted.

There may be instances when the trading system decreases the price improvement level of the dynamic order. In these instances, the dynamic order maintains its position in the stack while at the same time decreasing its price improvement level. Decreasing the price improvement level puts the dynamic order in a position to provide a more advantageous execution price than if the price improvement level remained at the higher price improvement level than necessary to maintain its position in the stack.

Figure 11:
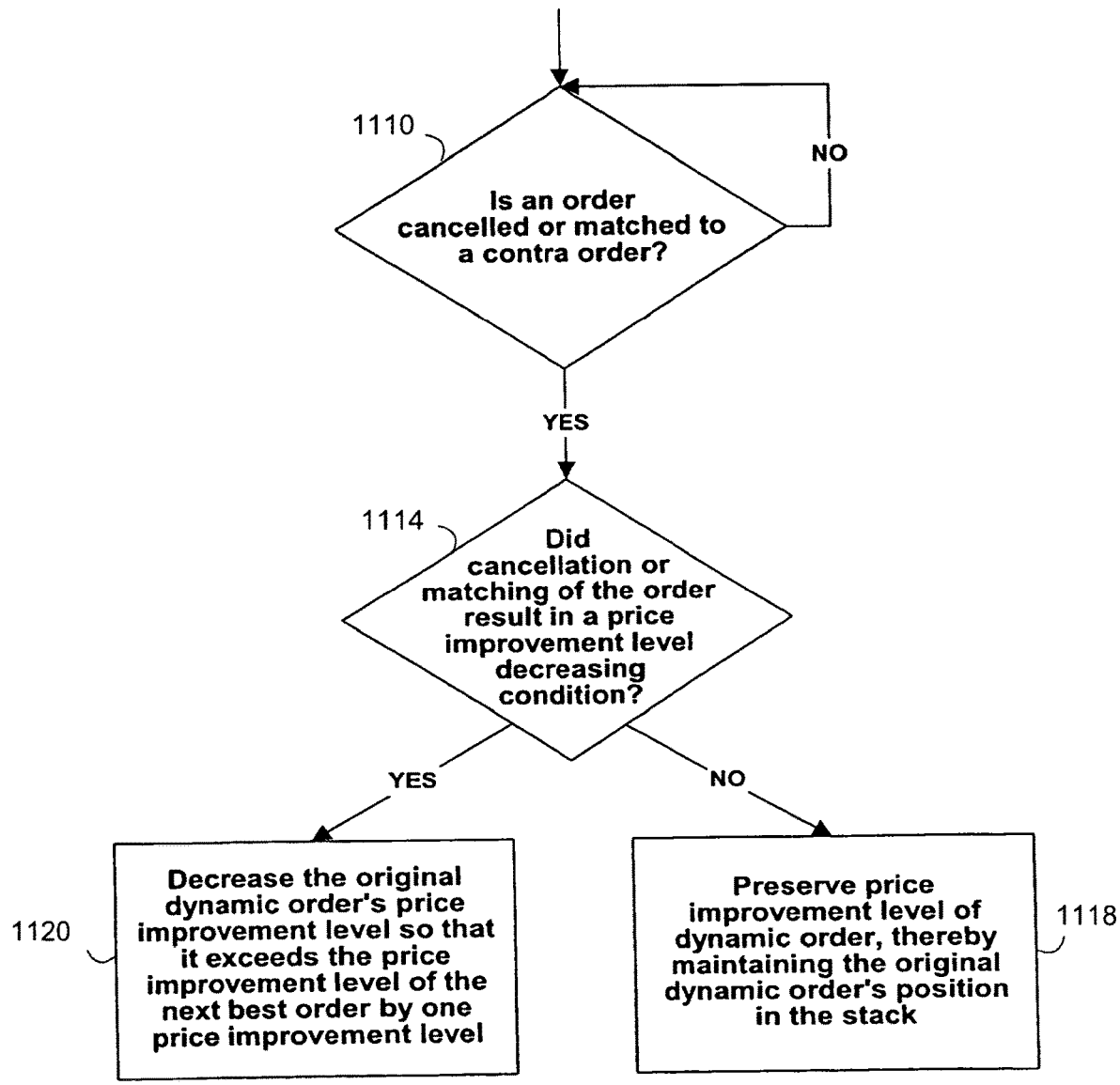
FIG. 11 shows an alternative illustrative flowchart of how the trading system maintains a dynamic order in a particular location in a trading stack.

FIG. 11 shows a flowchart illustrating steps that may be taken when an order is cancelled or matched with a contra order. Particularly, FIG. 11 illustrates how the system maintains a dynamic order in its predetermined position while at the same time possibly reducing the price improvement level of the dynamic order when orders are removed from the stack. In the context of this flowchart and for the purpose of clarity, the dynamic order potentially having its price improvement level reduced is referred to as the original (dynamic) order.

Beginning at step 1110, the system determines whether an order is cancelled or matched to a contra order. The system may continue to perform this check (as indicated by the feedback loop) until an order is cancelled or matched, at which point the process proceeds to step 1114. At step 1114, the system determines whether the cancellation or matching of the order results in a "price improvement level decreasing" condition.

A price improvement level decreasing condition occurs when the original order has a price improvement level that exceeds the price improvement level of the next best order by at least two price improvement levels. By way of example assume that the original order has a price improvement level of three and the next best order has a price improvement level of one. Here the difference in price improvement levels is two, thus resulting in a price improvement level decreasing condition because the price improvement level of the original order can be reduced to two and still maintain its position in the stack.

If there is no price improvement level decreasing condition present, the process proceeds to step 1118. At step 1118, the system does not change the price improvement level of the original order, but continues to maintain the original order's position in the stack. If there is a price improvement level decreasing condition present, then the process proceeds to step 1120.

At step 1120, the system may decrease the price improvement level of the original order so that it exceeds the price improvement level of the next best order by one level. Although FIG. 11 is discussed in the context of one dynamic order, the discussion can be applied to several dynamic orders. For example, if two or more dynamic orders are in the stack, each having the same price improvement level, a cancellation of an order having a price improvement level below that of the dynamic orders may create a price improvement level decreasing condition. If the condition exists, then the price improvement level may be decreased in both dynamic orders.

The steps shown in FIG. 11 are merely illustrative and additional steps may be added or steps may be omitted.

Figure 12:
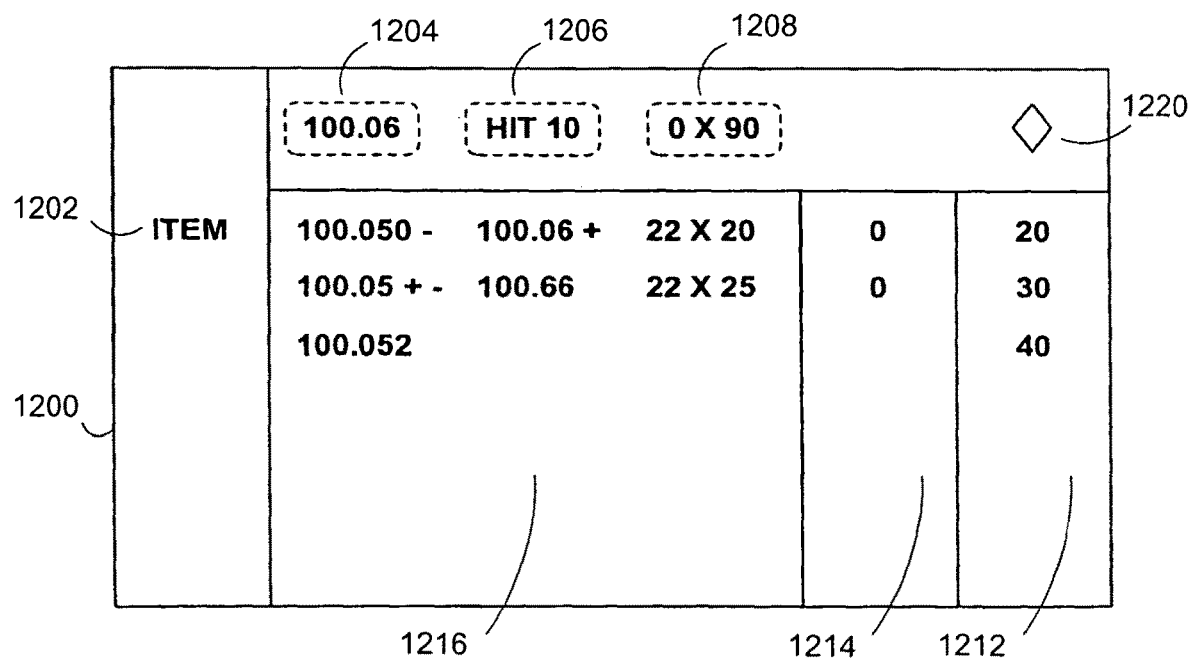

With reference now to FIG. 12, dynamic price improvement is described in context of market cell 1200 for a selected item. FIG. 12 is described primarily in the context of a trade state in which traders are actively buying and selling an item by submitting buy and sell orders. Although FIG. 12 is being described in the context of a trade state, dynamic price improvement may be used in conjunction with a bid/offer state in which traders submit bids and offers for an item.

FIG. 12 illustrates a market cell 1200 where users are participating in a market in which selected item 1202 is being traded. Selected item 1202 may be any suitable type of commodity such as, for example, securities, bonds, coupons, etc. Price 1204 indicates the current selling and/or buying price of selected item 1202. Trade status 1206 provides an indication of what type of trading activity is taking place with respect to selected item 1202. Item indicator 1208 provides an indication of the quantity of selected item 1202 available in the market. If, for example, sellers are operating in the active side of the market, the item indicator 1208 informs market participants the total number of items 1202 that are available for sale in the market. Seller stack 1212 informs market participants the quantity of selected items 1202 a particular seller is prepared to sell Likewise, buyer stack 1214 informs market participants the quantity of selected items 1202 a particular buyer is prepared to buy. Market depth indicator 1216 provides information regarding the depth of the market (i.e., the price and quantity of items available in the market, at prices different than the current price).

When a trader submits a dynamic order or a price improved order, a price improvement indicator 1220 may be displayed to indicate that price improvement is taking place. Price improvement indicator 1220 may be any suitable distinguishing character such as, for example, a diamond, a caret, text (e.g., PI) or other distinguishing mark. In FIG. 12, the presence of price improvement indicator 1220 indicates that at least one of the orders (e.g., the size 20, 30 or 40 orders) is price improved.

Price improvement indicator 1220 informs all market participants that at least one trader is prepared to trade a specified number of items at an improved price, regardless of whether the improved price is a price improvement order or a dynamic order. But traders (except the traders who submit price improved or dynamic orders) do not know what the price improvement level is.

Figure 13A:
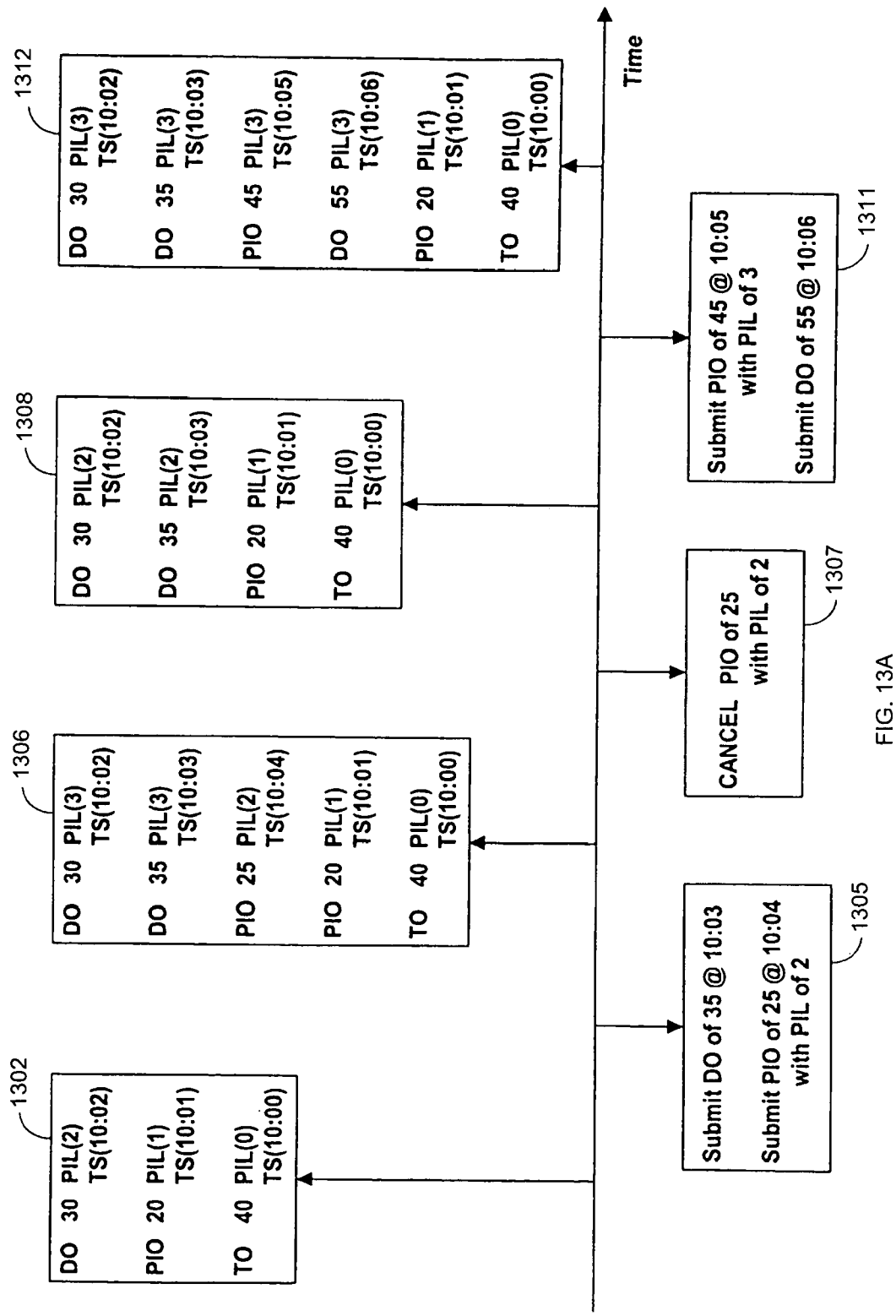
FIGS. 13A and 13B show an illustration of different modes of trading stacks that may occur.
Figure 13B:
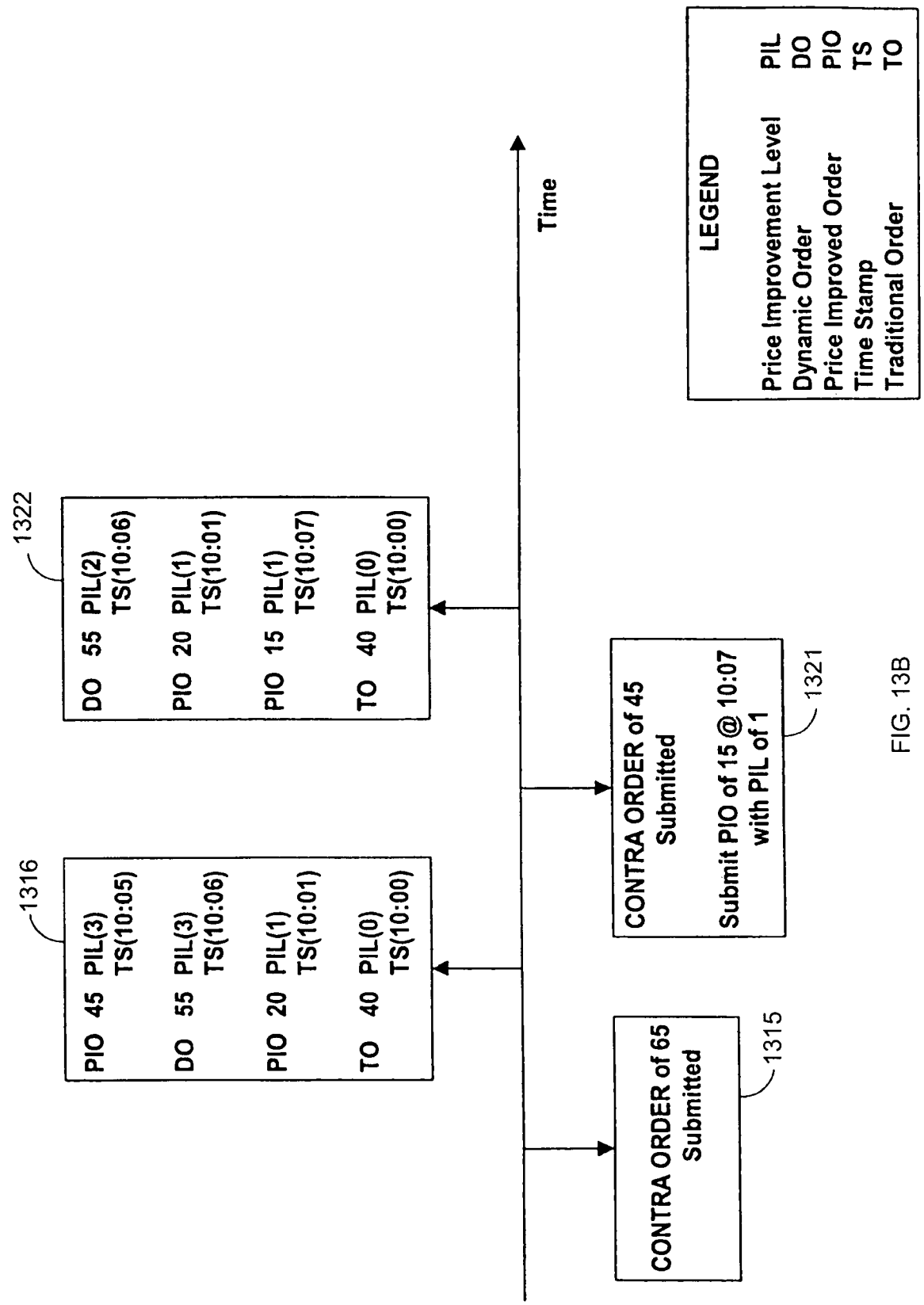

With reference now to the trading state diagram of FIGS. 13A and 13B, an example of how dynamic orders operate is now discussed. FIGS. 13A and 13B shows several sell stacks (e.g., the sell stack of FIG. 12) disposed along an axis representing time. Each stack includes orders, with each order having an order type (e.g., dynamic, price improvement, or traditional), a price improvement level (e.g., PI=1), and a timestamp (e.g., 10:03). The legend in FIG. 13B defines the attributes associated with the orders. Time progresses from left to right. Trade commands, which are shown below the time axis, may cause the trade system to modify the position of the orders in the stack. Several "snapshots" of the stack, which are shown above the time axis, are shown to illustrate how the trade system maintains the position of the dynamic orders.

Stack 1302 represents an arbitrary trading stack that may occur at a particular time. Stack 1302 includes a dynamic order, a price improved order, and a traditional order. When trade commands, such as those shown in trade step 1305 are issued, the trading system may arrange the orders as shown in stack 1306. As shown, submission of the price improved order with a price improvement level of two causes the price improvement level of the dynamic order in stack 1302 to increase to a price improvement level of three. At trade step 1307, the cancellation of the price improved order having the price improvement level of two results in a stack as shown in stack 1308. Stack 1308 shows that the price improvement level of both dynamic orders dropped down to a level of two because the next best order only has a price improvement level of one.

At trade step 1311, a price improved order and a dynamic order are submitted. Stack 1312 illustrates the positions of the orders after trade execution at trade step 1311. Note that for the purpose of this example, the maximum price improvement level is three. Thus, when the price improved order having a price improvement level of three is submitted, this forces the price improvement level of all the dynamic orders to three. Note, however, that the dynamic order of size 55 is positioned behind the size 45 order because its timestamp is after that of the size 45 order.

Stack 1316 shows the stack after the size 30 and size 35 orders are matched to a contra order submitted at trade step 1315. Trade step 1321 shows that a contra order of size 45 and price improved order with a price improved level of one are submitted. The contra order is matched with the price improved order of size 45, resulting in stack 1322. Note that the price improvement level of the dynamic order dropped down to two from three because the next best order has a price improvement level of one.

Dynamic orders can improve on orders of different types, such as limit, stop, good-till-canceled, all-or-none, market-if-touched, and is not limited to improving only on orders of the same type as the dynamic improved order.

Note that if a trader submits a traditional order using the next predetermined pricing increment, the type (e.g., stop, limit, etc.) of the order may determine whether the dynamic or price improved order remains in the stack.

One advantage is that it provides a monetary incentive for traders to trade items when price improvement orders for that item are available. For example, a trader may be provided with a rebate (e.g., a predetermined quantity of money), the quantity of which may depend on several factors (e.g., level of price improvement used and the size being traded). The size of the rebate may correspond to the level of price improvement used in matching orders. For example, a trader may receive a larger rebate for an order traded at a price improvement level of three than for an order traded at a price improvement level of one. For a dynamic order, the rebate awarded to the trader may be based on the price improvement level of the order when matched. Alternatively, the rebate awarded to a trader using a dynamic order may be fixed, irrespective of the price improvement level of the order when matched.

Alternatively, a rebate may be provided to the trader that decides to trade on a price improved order, but an order in the stack has a price improvement level of zero (i.e., the price improved order is the lone order in the stack). Because the price improvement level of the lone order is zero, the trader may not receive a rebate that corresponds to a particular level of price improvement. Rather, the trading system may provide the trader with the alternative rebate (e.g., a rebate that may be less than a rebate that would otherwise be received if the price improvement level is one or higher).

The trading system may send messages to traders to indicate what price improvement level is associated with their order. For example, when a user submits a dynamic price improvement order, the trading system may inform the trader which price improvement level is being used. Thereafter, if the price improvement level of the dynamic price improvement order changes, the system may transmit updated price improvement level information to the user.

IV. Neutral Price Improvement

An electronic trading system and method is provided that permits traders to submit price improvement orders that are traded at predetermined pricing increments and that maintain a position in a trading stack based on the size of other orders already existing in the stack at the time the order is submitted.

A predetermined pricing increment is typically defined by the instrument being traded. For example, the two-year United States government bond may trade at predetermined pricing increments of ¼ of 1/32 of a nominal value. If a stock is being traded, the stock may be traded at predetermined pricing increments of one penny. As another example, certain Exchange Traded US Stock Options may trade at a pre-determined standard price increment of five cents in price. In certain trading systems, a user may submit a traditional order, which has a price corresponding to a predetermined pricing increment. Traditional orders are sometimes referred to herein as PI(0) (orders at standard price increments without price improvement). In trading systems, such as those disclosed in application Ser. Nos. 10/826,779 and 10/171,009, traders may submit orders that improve on a price for a particular item at an amount less than a predetermined pricing increment. For clarity and ease of presentation, such orders are referred to herein as price improvement orders. For example, in such trading systems as detailed in application Ser. Nos. 10/826,779 and 10/171,009, price improvement orders include dynamic price improvement orders (e.g., PI(dynamic)) and orders having a specific price improvement level such as one (e.g., PI(1)), two (e.g., PI(2)), or three (e.g., PI(3)). The price improvement levels of price improving orders can also be set to ever decreasing economic values, to allow more price improvement levels to be utilized in a trading system.

In other trading systems, such as certain Exchange Traded US Stock Option trading systems, that use price improvement, such use of price improvement (i.e., price improvement levels) may be implemented only in certain trading scenarios (e.g., trading or price improvement states). Such trading systems may be referred to as an auction style of trading that uses price improvement. Such trading systems may permit traders to price improve on "active" orders, thereby enabling traders to submit price improved orders (using price improvement levels) to improve the price of the "active" order. For example, assume that a trader submits an order to sell a predetermined number of options at a particular price. Further assume that a contra-trader is prepared to buy those options at that particular price. Before the order is executed, other traders may submit orders to buy the options at an improved price (i.e., a price that price improves on the predetermined price using a price improvement increment). If such a price improved order is submitted, then the price improving trader takes precedence over the contra-trader.

Trading systems may permit traders to submit traditional orders, price improvement orders (PI), and neutral price improvement orders. Neutral price improvement orders may sometimes be referred to herein as PI(neutral), neutral PI order, or neutral order. A neutral PI order is an order that trades at the predetermined pricing interval and maintains a position in the trading stack based on the total size of orders existing in the stack prior to submission of the particular neutral PI order. An advantage of neutral PI orders is that they provide traders with yet another price improvement trading option. Yet, this particular option permits orders to be traded at non-price improved increments, while at the same time are not automatically trumped (e.g., overtaken or bettered) by necessarily all subsequently submitted price improvement orders, (whereas a traditional order would be automatically trumped and move down the pricing stack to allow the price improving order to improve its position).

Neutral PI orders may be handled by a trading system as follows. Upon receipt of a neutral PI order, the trading system may assign a timestamp to the order. This timestamp may be similar to the timestamps associated with other types of orders such as traditional and price improving orders. The trading system may place the neutral PI order behind all orders already existing in the trading stack. If the neutral PI order is the only order in the stack, then the neutral PI order is placed at the front of the stack.

A neutral PI order is not assigned a price improvement level even though neutral PI may be facilitated as a "price improvement option" on the system. As will be explained in more detail below, certain orders may be switched from being in front (or above) of the neutral PI order to be placed behind (or below) the neutral PI order.

When the neutral PI order is placed in the stack (at a certain regular predetermined pricing interval), it is assigned a position size limit. This position size limit is calculated by adding up the size of each order in front of the neutral PI order on entry of said PI neutral order into the trading stack. This position size limit is used by the electronic trading system to prevent the combined size of all orders in front of the neutral PI order from exceeding the noted position size limit of that particular neutral PI order, regardless of orders submitted subsequently thereafter, for the life of the neutral PI order, or some predetermined time, or such time as may be ended by a predetermined event. Thus, the position of a neutral PI order within the stack is determined as a function of the combined size of the orders in front of the neutral PI order, at its point of entry in the stack. That is, no matter how many subsequent price improving orders are submitted that would price improve on the neutral PI order, the combined size of orders in front of the neutral PI order may not exceed the position size limit.

In some cases, the position size limit may be a fraction or a multiple of the size existing in front of the PI neutral order on its entry to the stack. By preventing the combined size in front of the neutral PI order from exceeding the position size limit of that neutral PI order, the neutral PI order maintains a position in the stack based on its position size limit and the size of the orders in front of it.

Although the combined size of orders in front of a particular neutral PI order may not exceed the neutral PI order's position size limit, this position size limit may in time become smaller than the original position size limit associated with the neutral PI order. That is, the position size limit associated with a particular neutral PI order can be decreased. Such a decrease may occur when an order in front of the neutral PI order is matched with a contra order and/or in some cases when an order in front of the PI neutral order is cancelled.

In some cases the position size limit may be increased due to the end of a time period, or on a predetermined event affecting the trading system such as an economic figure or other external market moving event. The use of neutral PI orders may be governed by the trading system by increasing the position size limit to dilute or remove the neutral PI functionality by allowing other PI order size to then be promoted in front of PI Neutral.

In some cases, the position size limit may be decreased when an order (e.g., an older timestamp order or a newer timestamp order with a price improvement level of greater than zero) is cancelled or traded. In some cases, in the event of a cancellation of an order originally in front of the neutral PI order, the position size limit may decrease if there is no size from another order (e.g., dynamic PI order) behind the neutral PI order that can occupy the cancelled order's position in front of the neutral PI order.

The following explains by way of example how the trading system maintains the position of a neutral PI order in the trading stack with respect to size. In one example, if a neutral PI order is the first order in the stack, the trading system assigns a position size limit of zero to the order. Thus, no orders are permitted to jump in front of the neutral PI order because this would exceed the position size limit of the order. In some cases, a neutral PI order may still be trumped by other orders retaining special privileges such as a last trader privilege. A last trader privilege may permit a trader who was the last trader to have an order traded in the system to have the opportunity to jump in front of a trader submitting such a neutral PI order.

In another example, if the neutral PI order is preceded by at least one other order, the trading system assigns a position size limit equal to the combined size of each order in front of the neutral PI order. Regardless of subsequently submitted price improving orders, the combined size of the orders in front of the neutral PI order may not exceed its position size limit.

Although the combined size of order(s) existing in front of the neutral PI order may not be permitted to exceed the position size limit, price improving orders (e.g., PI(dynamic) or PI(2)) submitted subsequent to the neutral PI order may be switched in whole or in part with orders in front of the neutral PI order that have a lower PI level. This permits price improvement to commence within the confines of the position size limit set by a particular neutral PI order.

A portion of or all of a subsequently entered "superior" price improving order can improve on and displace a portion of or all of a pre-existing order residing in front of the neutral PI order in a trading stack. This "superior" price improving order may displace up to the full size of one or more "lesser PI level" orders that are in front of the neutral PI order, while still maintaining the position size limit of the neutral PI order being jumped. In certain trading situations, such a displacement may result in a split of the "superior" order into two or more sizes. For example, a "superior" PI order may be split in two, with one portion displacing an order in front of the neutral PI order and the other portion taking a position behind the neutral PI order (the position size limit of the PI neutral order having not been increased). Regardless of how a "superior" order is split, both portions may retain the same price improvement level or the order may have its price improvement levels split to show different price improvement levels in each position. Other trading situations may result in a split of "lesser PI" orders, where only a portion of that order is displaced behind a neutral PI order by a "superior" order.

If the "superior" price improving order is a dynamic order, the price improvement level may increase to improve on the price improvement level of any "lesser PI" order in the stack. For example, if the order being displaced has a price improvement level of one, the dynamic order may adjust its price improvement level to two to improve on the (older timestamp) order in front of the neutral PI order.

In the event an improving order (e.g., dynamic PI order) cannot get in front of a neutral PI order, the improving order may use a price improvement level to obtain the best position possible behind the neutral PI order. For example, in some cases of dynamic PI use, if the only order in front of the neutral PI order is a PI(dynamic) order, a subsequently entered PI(dynamic) order may not increase its price improvement level to match or exceed that of the first PI(dynamic) order. However, in the alternative, it may adjust its price improvement level to only improve on orders behind the neutral PI order.

FIGS. 14-19 show examples of trading operations using neutral PI orders. Each example shows the time sequence in which orders are submitted to the trading system. Each example also shows how orders are sorted in the stack. The examples also show the price improvement level of orders in the stack, if applicable. Referring now to FIG. 14, this example shows that the trading system receives orders A, B, and C before sorting. Order A is a traditional order (e.g., PI(0)) of size 5 m, where "m" may represent "million" and a size of "5 m" may represent 5,000,000. Order B is neutral PI order (e.g., PI(neutral)) of size 4 m. After order B is submitted, the trading system may assign a position size limit of 5 m to order B. Order C is a price improving order (e.g., PI(dynamic)) of size 3 m.

After order C is entered, the trading system may sort the stack. As shown, the full size (e.g., 3 m) of order C displaces 3 m of order A because order C price improves on order A. In this particular example, the price improvement level of order C increases to PI level one to improve on order A. Order A splits, causing 2 m of order A to remain in front of the neutral PI order (i.e., order B) and the remainder of 3 m to be placed behind order B. Thus, it is seen that order B maintains its position in the stack with respect to size. That is, the combined size of the orders in front of order B does not exceed 5 m.

Referring now to FIG. 15, this example shows that a traditional order (e.g., order A) of size 5 m, a neutral PI order (e.g., order B) of size 4 m, and a dynamic price improving order (e.g., order C) of size 40 m are received by the trading system. Once received, the trading system sorts the orders. As shown, the price improving order improves on and displaces the traditional order by increasing its price improvement level to one. Only 5 m of the price improving order is placed is front of the neutral PI order because the position size limit of the neutral order is 5 m. Thus, the price improving order is split, with 5 m in front of the neutral PI order and 35 m behind the neutral PI order. Note that 35 m of the price improving order takes precedence over the traditional order because it is price improved over the traditional order.

Referring now to FIG. 16, this example shows that a dynamic price improving order of size 5 m, neutral order of size 4 m, and a dynamic price improving order of size 40 m are submitted to the trading system. Once received, orders A, B, and C maintain their position because order C cannot improve on order A. Note, that the price improvement level of order A increases to one, while the price improvement level of order C remains at zero because order C did not achieve a better stack position.

FIG. 17 shows an example in which a neutral PI order is submitted first followed by a price improving order (e.g., a dynamic order). The trading system prevents the price improving order from jumping in front of the neutral PI order because the position size limit of the neutral PI order is zero. The price improvement level of the price improving order is kept at zero.

Cancellation of order(s) in front of a neutral PI order may result in a rearrangement of orders in the stack. For example, if an order having a timestamp older than the timestamp of a neutral PI order is cancelled, the stack may be sorted according to the price improvement levels and timestamps of all orders in the stack. Thus, when an order having an earlier timestamp than that of a neutral order is cancelled, this does not automatically reduce the position size limit. The price improvement levels and timestamps of the orders may be taken into account before effecting a change in the position size limit. FIG. 18 shows an example of this particular situation. FIG. 18 shows that a price improving order having a price level of one and size of 5 m is submitted first, followed by a neutral PI order of size 4 m and dynamic price improving order of size 40 m. These orders are sorted as shown. The price improvement level of the dynamic price improving order increases to a PI level of two to improve on and displace the level one price improvement order.

When order A is cancelled, the trading system may re-sort the stack according to price improvement levels and timestamps. In some cases, with order A removed, 5 m of order C may remain in front of order B because order C has a superior PI level (e.g., PI(2)), even though order A has an older timestamp than order B. As shown, the price improvement level of order C may drop down to level one because a price level of two is not needed to maintain its position in the stack when order A is cancelled.

As another example, if an order having a timestamp younger than the timestamp of the neutral PI order is cancelled (it may be in front of a PI neutral order due to a superior PI level displacing a lower PI level order), the stack may be sorted such that the order(s) that were previously in front of the neutral PI order are restored to their previous position to the maximum size possible, respective to the position size limit of each neutral PI order. FIG. 19 illustrates such an example. FIG. 19 is similar to FIG. 18 except that order C is cancelled, as opposed to order A. With the cancellation of order C, order A is restored to its original position in the stack.

When an order in front of the neutral PI order is executed or matched with a contra order, the position size limit associated with that neutral PI order may be decreased by the size of the execution or match. For example, if the position size limit of a particular neutral PI order is 5 m, an execution or match of 3 m in front of this neutral PI order may reduce the position size limit of the neutral PI order to 2 m. Consider, for example, the trading scenario shown in FIG. 14. If the dynamic order C is executed or matched entirely, it would be removed from the stack. The 3 m of the traditional order behind the neutral PI order may not be allowed to entirely move back in front of the neutral order because the position size limit of order B has been reduced to 2 m. Thus, only the 2 m of order A remains in front of order B. However, if a new dynamic PI order of size 5 m were to be submitted, 2 m of this new dynamic PI order may displace the 2 m of the order A.

In some cases, either the cancellation or matching of an order may result in a decrease in the position size limit. Considering, for example, the trading scenario shown in FIG. 14. If the traditional order A is matched or cancelled for 2 m, the position size limit may be reduced to 3 m (from 5 m) because 2 m of the traditional order in front of order B is removed. In some cases, the position size limit of a particular neutral PI order may be decreased only when (a) an order is cancelled and (b) there is no order (e.g., dynamic order) behind the neutral PI order that can take the place of the cancelled order. Consider, for example, the trading scenario in FIG. 16. If order A is cancelled, the position size limit of neutral PI order B is maintained at 5 m because 5 m of dynamic order C can occupy the position vacated by the 5 m of order A that was cancelled. However, if order C was a traditional order, for example, the position size limit of order B may decrease to zero when order A is cancelled because the traditional order C cannot jump in front of order B.

Neutral PI orders may not be traded/executed at improved prices. As a result, traders that use neutral PI orders may not have to pay fees (e.g., fees paid to contra trader and/or to the electronic trading system host) or benefit from trading against other contra orders executed at a price improved price. Rather, traders that use neutral PI may pay a predetermined fee, which may be determined irrespective of the price at which an order is traded.

Figure 20:
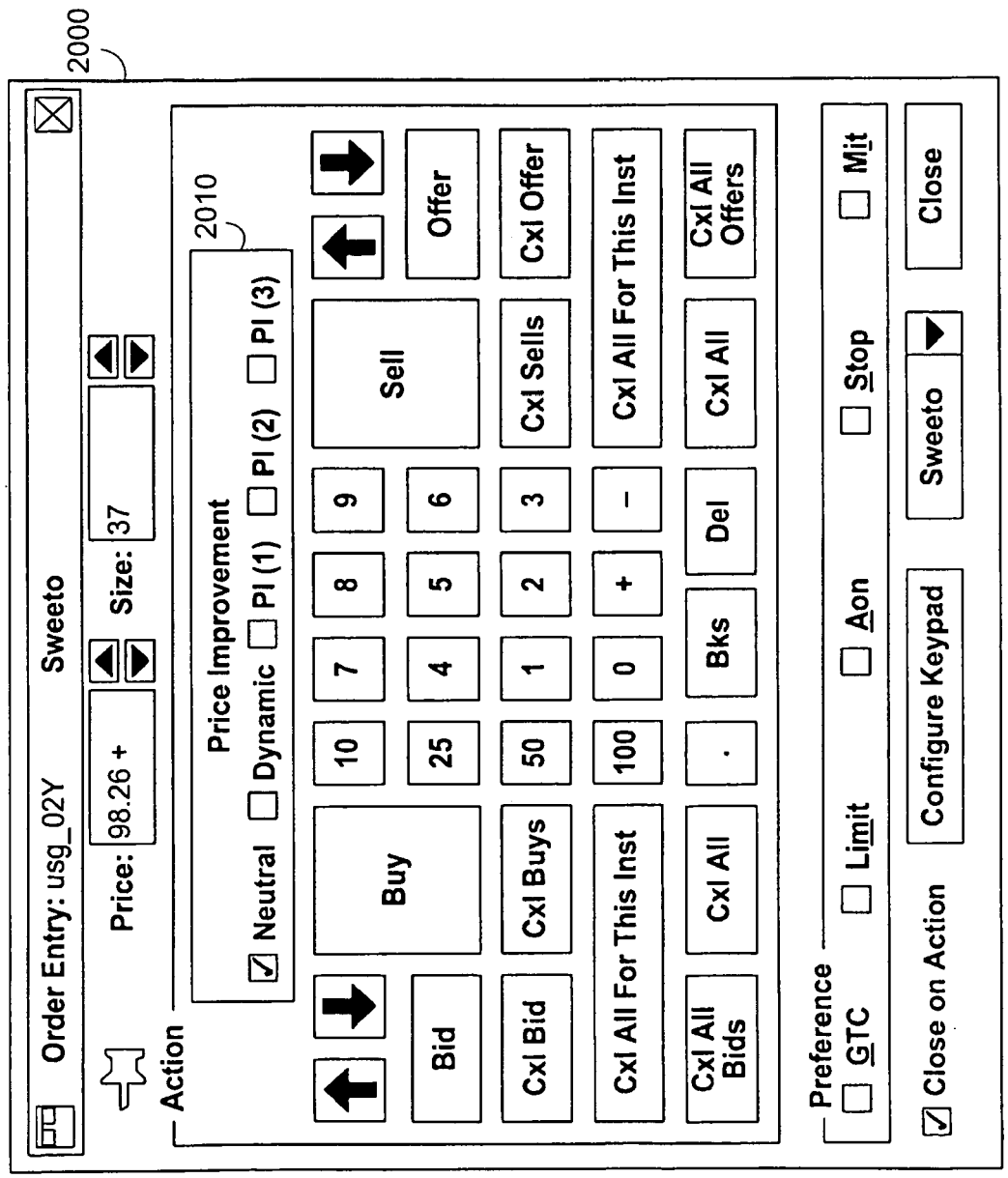
FIG. 20 illustrates a graphical interface for submitting trading commands.

FIG. 20 illustrates a graphical interface 2000 for submitting trading commands using, for example, a workstation as shown in FIG. 1A. Interface 2000 includes price improvement trading box 2010, which has first, second, and third price improvement level options, a dynamic price improvement option, and a neutral price improvement option that can be selected by the trader. If a trader wishes to trade using neutral price improvement, the neutral price improvement option in box 2010 can be selected. Selection of this box can change the nature of the application pertaining specifically to the instrument being traded such as, for example, not displaying indicia that indicates existence of price improvement used on a standard price level, and preventing a trader from receiving a financial benefit of trading with other price improved orders. Traders may also select PI neutral to be a default application for all instruments in any particular market sector, or all instruments in general.

The above description with respect to FIG. 20 is not intended to be an exhaustive description of various features that can be included with dialog window 2000. United States patent application publication No. 2002-0029180 published Mar. 7, 2002, which is hereby incorporated by reference in its entirety, provides a substantial description of dialog window 2000.

Price improvement trading can be implemented with a variety of trading schemes such as, for example, Direct Dealing (hereinafter "DD"—sometimes referred to as "Request for Quote" style trading) and traditional market style trading. In DD style trading, there are requestors and responders. The requestors can enter a request for prices on a particular item or instrument. A responder may submit prices in response to that request. The requestor may then choose to trade with one of the responders.

A traditional market style of trading may be one that enables traders to submit bids and offers for a particular item. Traders can hit a bid or lift an offer to commence a trade. Other traditional market styles of trading may also enable traders to submit bid and offer orders for automatic matching where possible, such as in a futures market. Further traditional styles of market trading may be an auction style where a bid or an offer for an amount of an instrument is introduced to a marketplace for participants to offer or bid in an auction process, thereby determining a trade price for that amount of the instrument.

Figure 21:
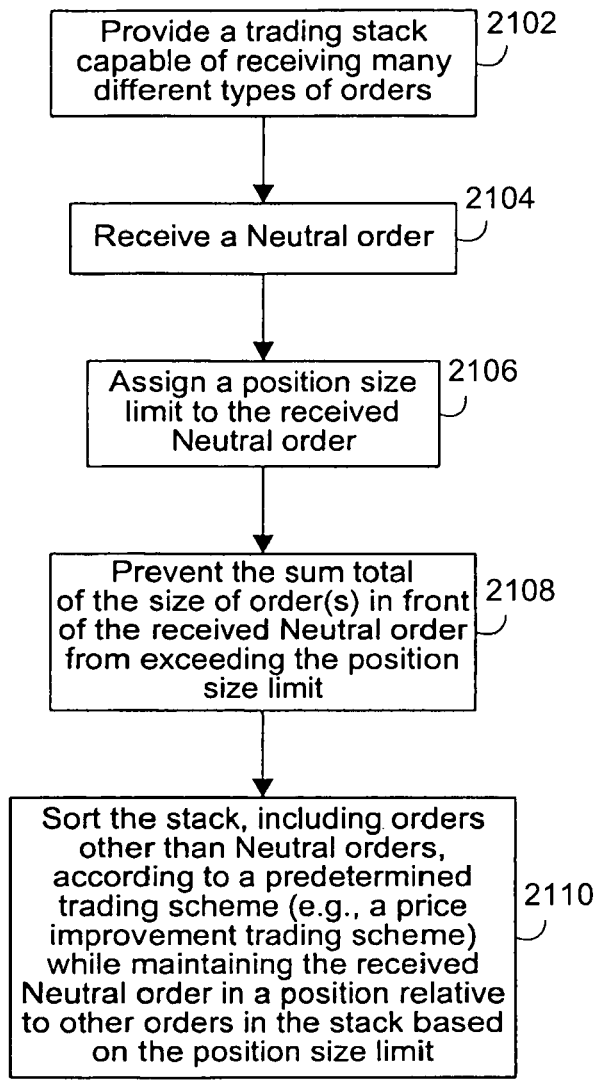
FIG. 21 shows an illustrative flowchart of a process for handling neutral orders.

FIG. 21 shows a flow chart of illustrative steps that may be taken by a system using neutral price improvement. Beginning at step 2102, a trading stack capable of receiving many different types of orders is provided. The various types of orders may include, but are not limited to, traditional orders, neutral orders, RFQ orders, direct dealing orders, and price improvement orders such as price level price improvement orders, dynamic price improvement orders.

After a neutral order is received at step 2104, a position size limit is assigned to the received neutral order, as indicated by step 2106. As discussed above, the position size limit may be used to limit the total size of orders in front of the neutral order, thereby allowing price improvement rules to govern the operation of orders in the stack, yet still enable the neutral order to remain competitive. The received neutral order may remain competitive by preventing the total size of order(s) in front of the received neutral order from exceeding the position size limit, as indicated in step 2108. At step 2110, the orders in the stack may be sorted according to a predetermined trading scheme (e.g., a price improvement trading scheme) while maintaining the received neutral order in a position relative to other orders in the stack based on the position size limit. Several examples relating to step 2110 are discussed above in connection with FIGS. 1-19.

Figure 22A:
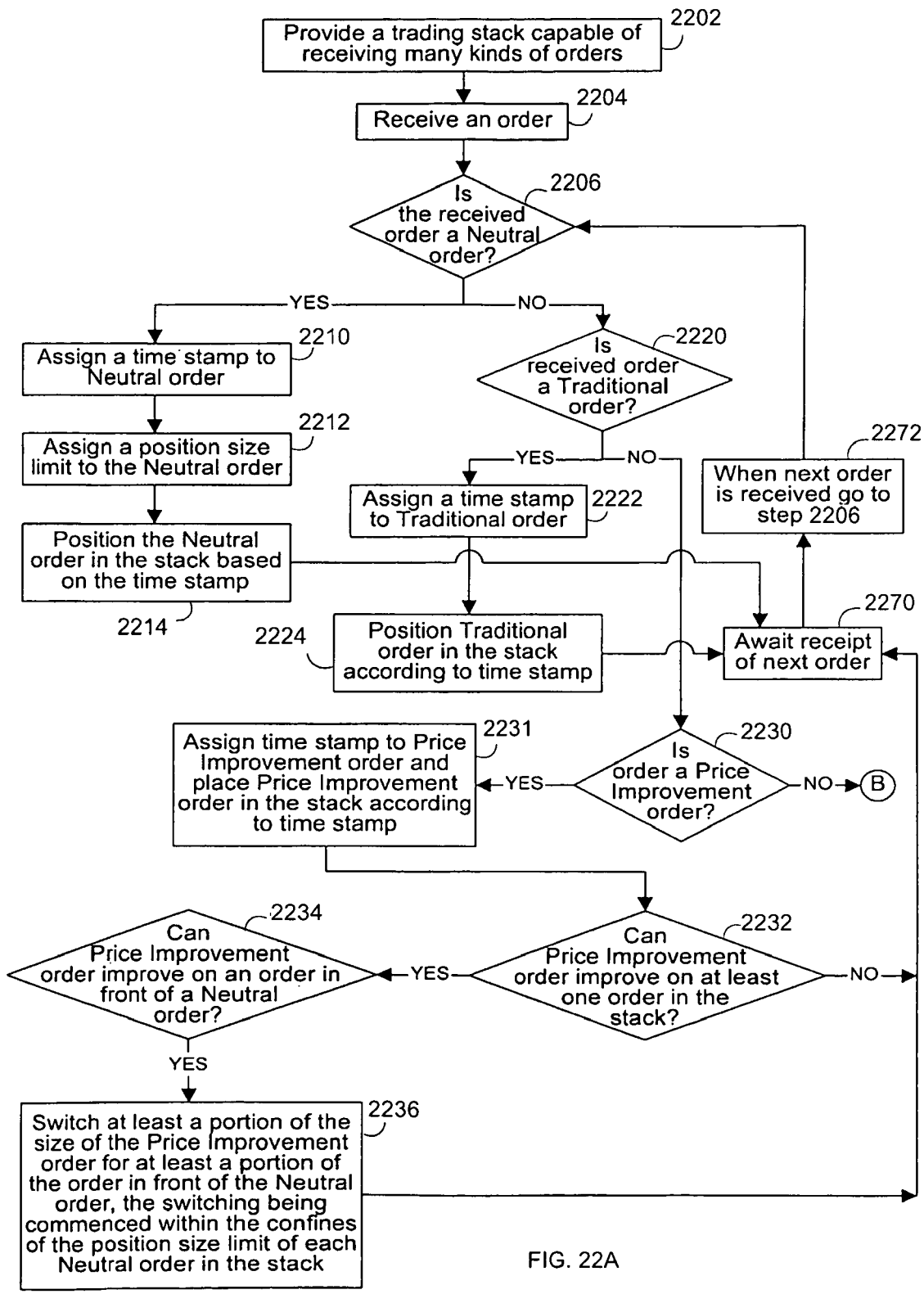
FIG. 22 shows an alternative flowchart of a process for handling orders received by an electronic trading system.
Figure 22B:
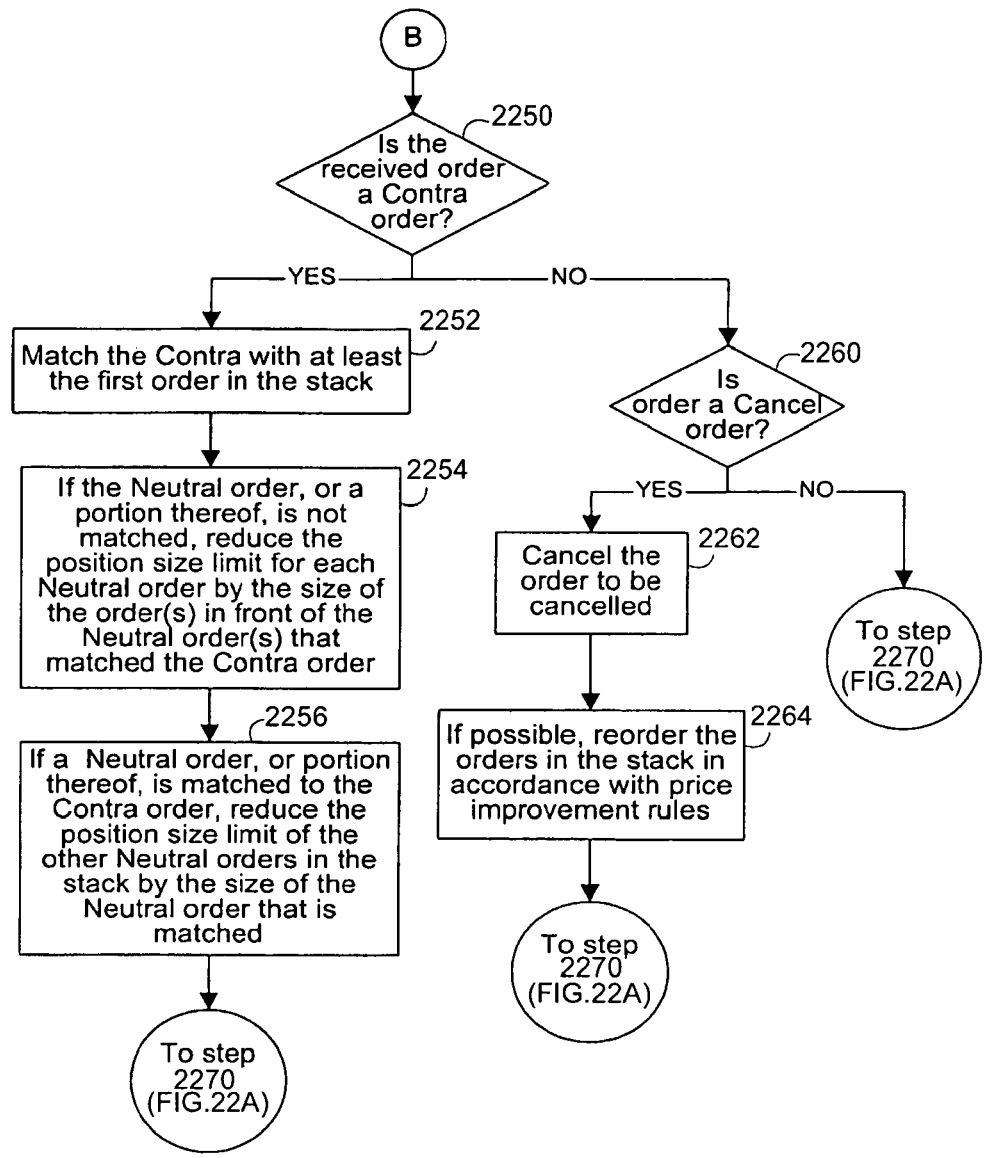

FIGS. 22A and 22B show a flow chart illustrating steps that may be taken by a system using neutral price improvement. Starting at step 2202, a trading stack capable of receiving many different types of orders is provided. At step 2204, an order is received and a determination is made at step 2206 as to whether the received order is a neutral order. If the received order is a neutral order, the process proceeds to step 2210, which assigns a timestamp to the neutral order. A position size limit is assigned to the neutral order at step 2212. At step 2214, the neutral order is positioned, at least initially, in the stack based on the timestamp. For example, if three orders exist in the stack at the time the neutral order is received, the neutral order may be placed in the fourth position in the stack. After the neutral order is positioned in the stack, the process proceeds to step 2270, where the system awaits receipt of the next order. When an order is received, at step 2272, the process loops back to step 2206.

If at step 2206, it is determined that the received order is not a neutral order, the process proceeds to step 2220, which determines if the received order is a traditional order. If the received order is a traditional order, a timestamp is assigned to the traditional order (at step 2222) and it is positioned in the trading stack according to its timestamp (at step 2224). After the traditional order is placed in the stack, the process proceeds to step 2270. If it is determined that the received order is not a traditional order, the process proceeds to step 2230, which determines if the received order is a price improvement order.

If the received order is a price improvement order, then at step 2231, a time stamp is assigned to the order and it is placed in the stack according to that timestamp. Then at step 2232, a determination is made if the price improvement order can price improve on at least one order in the stack. If price improvement is possible, a determination is made to see if the price improvement order can price improve on an order in front of a neutral order, at step 2234. If price improvement is not possible at step 2232, the process proceeds to step 2270.

If the determination at step 2234 indicates that the price improvement order can price improve on an order in front of the neutral order, then at step 2236, the trading system may switch at least a portion of the size of the price improvement order for at least a portion of the order in front of the neutral order, with any switching being commenced within the confines of the position size limit of each neutral order in the stack. The price improvement order cannot substitute any portion of a neutral order. The examples described above in connection with FIGS. 1-16 relate to step 2236. After switching of orders is complete at step 2236, the process proceeds to step 2270. If the determination at step 2234 is NO, the process proceeds to step 2270.

At step 2250, a determination is made if the received order is a contra order. A contra order may be an order that can be matched or traded with an order in the stack. For example, if the orders in the stack are buy orders, a contra order would be a sell order. If the order is a contra order, the contra order is matched with at least the first order in the stack, as shown in step 2252. The contra order may match a portion of an order in the stack, in which case the portion may just be a portion of the order because the contra order is smaller than the size of the order in the stack or because the contra order fully matches the size of the order in a particular location in the stack, with a remaining portion of that order existing elsewhere in the stack. In other cases, the contra order may be matched with the entire size of an order and not just a portion thereof. A portion of the contra order may be matched, at least initially, if orders existing in the stack are not large enough to fully fill the contra order.

After the contra order, or portion thereof, is matched and if a neutral order, or portion thereof, is not matched, the position size limit for each neutral order may be reduced by the size of the order(s) matched in front of the neutral order(s). This step is shown in step 2254. If a neutral order, or portion thereof, is matched with the contra order, the position size limit of the other neutral orders in the stack is reduced by the portion of the size of the neutral order that is matched. When the position size limit or limits have been properly reduced, the process proceeds to step 2270.

If at step 2250 it is determined that the received order is not a contra order, the process proceeds to step 2260, which determines if the received order is a cancel order. If so, the order to be cancelled in the stack is cancelled at step 2262. An example of this is discussed above in connection with FIG. 19. If possible, various orders may be rearranged in accordance with predetermined trading rules at step 2264. An example of this is discussed in connection with FIG. 18. After step 2264 or if the received order is not a cancel order, the process proceeds to step 2270.

The steps shown in FIGS. 22A and 22B are merely illustrative and additional steps may be added or one or more steps may be omitted. For example, additional steps may be added to show how the system handles an erroneously entered order. As another example, additional steps may be added to indicate how the price improvement level of various price improvement orders is increased or decreased depending on market conditions.

Figure 23:
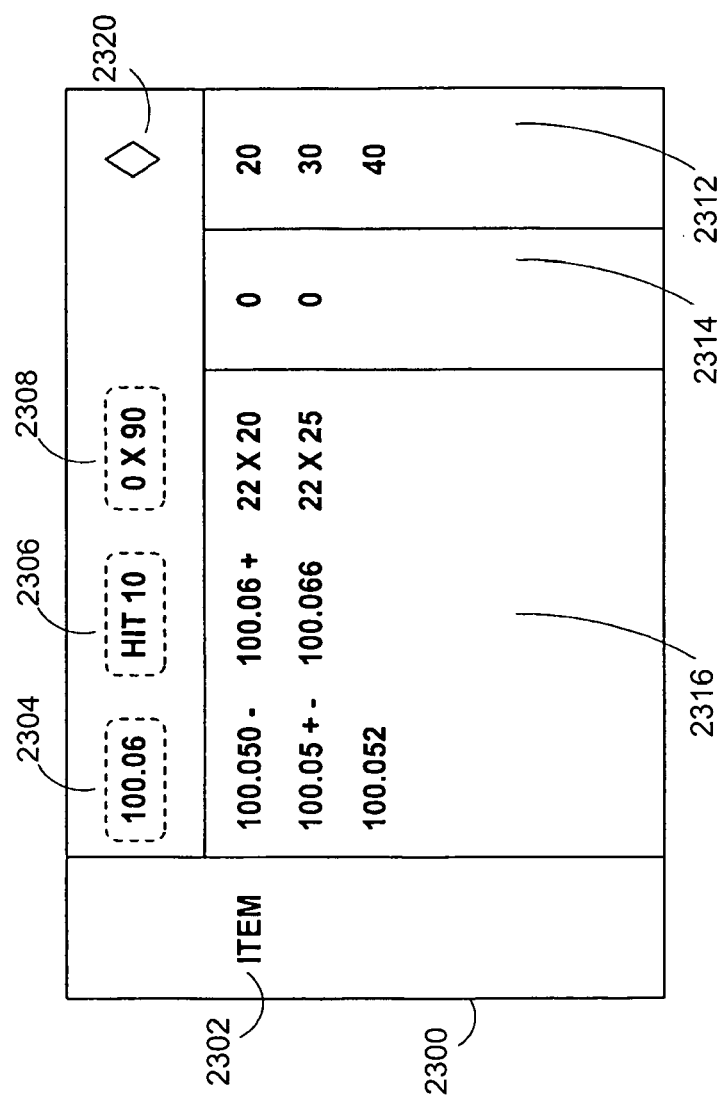
FIG. 23 shows an illustration of a market cell.

With reference now to FIG. 23, neutral price improvement is described in context of market cell 2300 for a selected item. FIG. 23 is described primarily in the context of a trade state in which traders are actively buying and selling an item by submitting buy and sell orders. Although FIG. 23 is being described in the context of a trade state, neutral price improvement can be used in conjunction with a bid/offer state in which traders submit bids and offers for an item, any automatic matching thereof, and any auction style matching thereof.

FIG. 23 illustrates a market cell 2300 where users are participating in a market in which selected item 2302 is being traded. Selected item 2302 may be any suitable type of commodity such as, for example, securities, bonds, coupons, etc. Price 2304 indicates the current selling and/or buying price of selected item 2302. Trade status 2306 provides an indication of what type of trading activity is taking place with respect to selected item 2302. Item indicator 2308 provides an indication of the quantity of selected item 2302 available in the market. If, for example, sellers are operating in the active side of the market, the item indicator 2308 informs market participants the total number of items 2302 that are available for sale in the market. Seller stack 2312 informs market participants the quantity of selected items 2302 a particular seller is prepared to sell Likewise, buyer stack 2314 informs market participants the quantity of selected items 2302 a particular buyer is prepared to buy. Market depth indicator 2316 provides information regarding the depth of the market (i.e., the price and quantity of items available in the market, at prices different than the standard predetermined increment price).

When a trader submits a price improving order, a price improvement indicator 2320 may be displayed to indicate that price improvement is taking place. Price improvement indicator 2320 may be any suitable distinguishing character such as, for example, a diamond, a caret, text (e.g., PI) or other distinguishing mark. Price improvement indicator 2320 may be displayed if a neutral PI order is the only order in the stack, so subsequent price improving traders are made aware that a neutral PI order or a price improving order is already in the stack. In some cases, price improvement indicator 2320 may not be displayed on account of a neutral PI order, and may only be displayed if at least one other price improving order (e.g., PI(dynamic)) already exists in the stack. If a neutral PI order is matched with a contra order, then in certain situations the system may compensate the contra trader in accordance with price improving rules, but the neutral trader may still only trade at the standard price increment.

Neutral PI orders may be applied to different types of orders, such as limit, stop, good-till-canceled, all-or-none, market-if-touched.

V. Hardware

Referring to FIG. 1A, exemplary system 100 for implementing price improvement may include one or more trading workstations 101. Workstations 101 may include a mouse 106, a keypad 107, and a display 108. Workstations 101 may be local or remote, and are connected by one or more communications links 102 to computer network 103 that is linked via communications links 105 to server 120. Server 120 is linked via communications link 110 to back office clearing center 130.

In system 100, server 120 may be any suitable server, processor, computer, or data processing device, or combination of the same. Server 120 may be used to process the transactions entered into by one or more traders.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 120, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same.

Back office clearing center 130 may be connected to server 120 of the trading system via communications link 110. Back office clearing center 130 may be any suitable equipment, such as a computer, a laptop computer, a mainframe computer, multiple processors, etc., or any combination of the same, for causing the proposed transaction, and other transactions such as trades with neutral PI orders, to be cleared and/or verifying that transactions are cleared.

Communications link 110 may be any communications links suitable for communicating data between server 120 and back office clearing center 130, such as network links, dial-up links, wireless links, hard-wired links, etc.

The server, the back office clearing center, and one of the workstations, which are depicted in FIG. 11, are illustrated in more detail in FIG. 1B. Referring to FIG. 1B, workstation 101 may include processor 109(*a*), display 108, input devices 106, 107, and memory 109(*b*), which may be interconnected. Memory 109(*b*) may contain a storage device for storing a workstation program for controlling processor 109(*a*). Processor 109(*a*) uses the workstation program to present on display 108 information relating to the proposed transaction to a user of workstation 101. Furthermore, input device 106, 107 may be used to enter such information and to enter into the proposed transaction or execute a trade through, for example, entering a command that may be received by processor 109(*a*) and communicated to server 120.

Server 120 may include processor 121, display 122, input device 123, and memory 124, which may be interconnected. Memory 124 may contain a storage device for storing the information relating to the transactions entered into by one or more traders. The storage device further contains a server program for controlling processor 121. Processor 121 may use the server program to process the transaction information and commands displayed to and received from the trader. Processor 121 may use the server program to process the proposed transaction. Processor 121 may include calculation processor 121 that determines, for example, the monetary quantity provided to a price improving trader that executed an order using price improvement. Processor 121 may include transaction processor 126 that processes the transaction entered into by the trader. Processor 126 may, for example, match potential buyers and sellers by matching their credit risks or the bid/offer prices they have entered.

Back office clearing center 130 may include processor 131, display 132, input device 135, and memory 134, which may be interconnected. Memory 134 may contain a storage device for storing a clearing program for controlling processor 131. Processor 131 uses the clearing program to complete the transactions that are entered into by the trader. Processor 131 uses the clearing program to further verify that the transactions and trades are completed and cleared.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. In many cases, one feature or group of features may be used separately from the entire apparatus or methods described. Many of those undescribed variations, modifications and variations are within the literal scope of the following claims, and others are equivalent.

The invention claimed is:

1. A method comprising:
managing, by at least one processor, a stack of data in a memory coupled to the at least one processor, the stack of data repreenting a plurality of orders for purchase and sale of a financial instrument, each order having a side, a price, and a timestamp
maintaining, by the at least one processor, a trading priority in the stack of data in the memory such that at least some orders are traded against opposite-side orders based at least partially on a primary trading priority by price and a secondary trading priority by timestamp;
varying, by the at least one processor, a price of at least some of the orders that are designated at price-improvement orders over time until the at least one processor detects a contra-matching order;
receiving a request from a trader to prevent display of indicia that (1) indicates existence of price improvement used on a standard price level and (2) prevents a trader from receiving an indication of other price improved orders;
in response to the request from the trader, transmitting commands to graphical user interfaces of computing devices of traders to prevent display of indicia that (1) indicates existence of price improvement used on a standard price level and (2) prevents a trader from receiving an indication of other price improved orders;
removing, by the at least one processor, an order from the stack;
transmitting, by the at least one processor, the order removed from the stack to an electronic trading market;
inserting, by the at least one processor, received neutral orders into the stack of data in the memory, wherein the received neutral orders are not subject to the trading priority; and
varying, by the at least one processor, the price of the neutral orders in the stack.

2. The medhod of claim 1, wherein the price improvement orders are either an offer to sell at a price lower that a lowest price offer to sell currently in the stack or a bid to buy at a price higher than a highest price bid to buy currently in the stack.

3. The method oc claim 1, further comprising:
configuring, by the at least one processor, a standard price increment for prices of the plurality of orders in the stack and a price improvement protocol for improving prices in the stack.

4. The medhod of claim 3, further comprising: configuring, by at least one processor, a size limit for a received neutral order based at least partially on a cumulative size of same-side order in the stack with a higher priority that the reeived neutral order, when the at least one processor inserts the received neutral order into the stack; and
maintaining, by the at least one processor, a trading priority of the received neutral order in the stack against subsequently received orders that have a higher trading priority than the received neutral order; and
in response to determining that the received neutral order has reached a position size limit, maintaining, by the at least one processor, the received neutral order at a current priority in the stack.

5. The method of claim 4, further comprising:
reducing, by the at least one processor, the positioin size limit of the received neutral order by a traded size of at least one higher priority order.

6. The method of claim 1, further comprising:
in response to removing a price-improvement order with a higher priority than a given neutral order and the given neutral order having reached a position size limit, moving a price-improvement order with a priority lower than that of the given neutral order to a position in the stack that is higher than the given neutral order.

7. The method of claim 6. further comprising:
splitting, by the at least one processor, a given price improvement order into at least a first price improvement order and a second price improvement order; and
setting, by the at least one processor, a priority of the first improvement order or the second improvement order higher that the neutrol order.

8. The method of claim 1, further comprising
in response to removing an order with a higher priority than a given neutral order from the stack, reducing, by the at least one processor, a size limit of the given neutral order by a size of the remove order.

9. The method of claim 1, preventing a total size of the orders with a higher priority than a given neutral order from exceeding a position size limit.

10. An apparatus comprising:
a memory;
at least one processor to:
manage a stack of data in the memory, the stack of data representing a plurality of orders for purchase and sale of a financial instrument, each order having a side, a price, and a timestamp
maintain a trading priority in the stack of data in the memory such that at least some orders are traded against opposite-side orders based at least partially on a primary trading priority by price and a secondary trading priority by timestamp;
receive a request from a trader to prevent display of indicia that (1) indicates existence of price improvement used on a standard price level and (2) prevents a trader from receiving an indication of other price improved orders;
in response to the request from the trader, transmit commands to graphical user interfaces of computing devices of traders to prevent display of indicia that (1) indicates existence of price improvement used on a standard price level and (2) prevents a trader from receiving an indication of other price improved orders;
vary a price of at least some of the orders that are designated at price-improvement orders over time until the at least one processor detects a contra-matching order;
remove an order from the stack;
transmit the order removed from the stack to an electronic trading market;
insert received neutral orders into the stack of data in the memory, wherein the received neutral orders are not subject to the trading priority; and
vary the price of the neutral orders in the stack.

11. The apparatus of claim 10, wherein price improvement orders are either an offer to sell at a price lower than a lowest price offer to sell currently in the stack or a bid to buy at a price higher than a highest price bid to buy currently in the stack.

12. The apparatus of claim 10, whereing the at least one processor is further configured to generate a standard price increment for prices of the plurality of orders in the stack and a price improvement protocol for improving prices in the stack.

13. The apparatus of claim 12, wherein the at least one processor is further configured to generate a size limit for a reeived neutral order based at least partially on a cumulative size of same-side orders in the stack with a higher priority than the received neutral order, when the at least one processor inserts the received neutral order into the stack; and maintain a trading priority of the reeived neutral order in the stack against subsequently received orders that have a higher trading priority than the received neutral order; and in responie to detrermining that the received neutral order has reached a position size limit, maintain the receive neutral order at a current priority in the stack.

14. The apparatus of claim 13, wherein the at least one processor is further configured to reduce the position size limit of the received neutral order by a traded size of at least one higher priority order.

15. The apparatus of claim 10, wherein the at least one processor is further configured to move a price-improvement order with a priority ower than that of the given neutral order to a position in the stack that is higher than the given neutral order, in response to removing a price-improvement order with a higher priority than a given neutral order and the given neutral orrder having reached a position size limit.

16. The apparatus of claim 15, wherein the at least one processor is further configure to:

split a given price improvement order into at least a first price improvement order and a second price improvement order; and set a priority of the first price improvement order or the second price improvement order higher that the neutral order.

17. The apparatus of claim 10, wherein the at least one processor is further configured to reduce a size limit of the given neutral order by a size of the removed order, in response to removing an order with a higher priority than a given neutral order from the stack.

18. The apparatus of claim 10, wherein the at least on processor is further configured to prevent a total size of the orders with a higher priority than a given neutral order from exceeding a position size limit.

* * * * *